United States Patent [19]

Beals et al.

[11] 4,043,227
[45] Aug. 23, 1977

[54] HYDROMECHANICAL TRANSMISSION

[75] Inventors: Charles E. Beals, Pekin, Ill.; Robert O. Chambers, Dorchester, Mass.; Edwin E. Hanson, Peoria; Ronald L. Satzler, Princeville, both of Ill.

[73] Assignee: Caterpillar Tractor Co., Peoria, Ill.

[21] Appl. No.: 607,723

[22] Filed: Aug. 23, 1975

[51] Int. Cl.² .............................................. B60K 41/04
[52] U.S. Cl. ........................................ 74/868; 74/720
[58] Field of Search ................ 74/687, 682, 718, 865, 74/867, 868, 869, 720

[56] References Cited

U.S. PATENT DOCUMENTS

| | | | |
|---|---|---|---|
| 3,534,623 | 10/1970 | Smith | 74/687 |
| 3,580,107 | 5/1971 | Orshansky | 74/867 |
| 3,611,838 | 10/1971 | Utter | 74/687 |
| 3,733,931 | 5/1973 | Nyman | 74/868 |
| 3,744,344 | 7/1973 | Olsen | 74/687 |
| 3,783,711 | 1/1974 | Orshansky | 74/867 |
| 3,888,139 | 6/1975 | Orshansky | 74/687 |

*Primary Examiner*—Samuel Scott
*Assistant Examiner*—Frank H. McKenzie, Jr.
*Attorney, Agent, or Firm*—Phillips, Moore, Weissenberger, Lempio & Majestic

[57] ABSTRACT

A hydromechanical vehicle transmission system for an engine most efficiently operated at a single speed is disclosed providing an infinitely variable reduction ratio for a given constant input speed requiring minimum operator skill in operation of the vehicle speed control and the engine torque control in both full and part load operation. The transmission consists of a multi-speed hydrostatic mechanical arrangement using a variable displacement hydrostatic pump-motor in conjunction with a fixed displacement hydrostatic pump-motor providing two power paths through the transmission, one hydrostatic and one mechanical. The preferred embodiment discloses four gear ranges although three gear ranges are sufficient to fulfill the objects of the invention. A split torque recycling planetary unit is coupled with the hydrostatic units and two conventional planet trains, the low and reverse range being fully hydrostatic, the intermediate ranges a combination of hydrostatic and mechanical drive, the high range being hydrostatic and mechanical in the lower output speed portion and fully mechanical in the higher output speed area when the hydrostatic path is locked out and engine speed is increased.

Control of the transmission is provided through a hydraulically operated automatic system allowing minimum override capability on the part of the operator. Automatic shifting of reduction ratio is accomplished by comparing actual engine speed to an operator commanded engine speed with resulting upshifting or downshifting of the variable displacement unit and if required a selection of a different gear range occuring without operator intervention except for a capability to limit the highest ratio selected to one of the four gear ratios. The fully hydrostatic low and reverse range may be fully controlled by the operator limiting the displacement of the variable displacement hydrostatic pump-motor to a selected level.

15 Claims, 35 Drawing Figures

DISPLACEMENT OF VARIABLE DISPLACEMENT PUMP-MOTOR AND RELATIVE SPEED OF INTERMEDIATE MEMBERS AS A FUNCTION OF TRANSMISSION RANGE

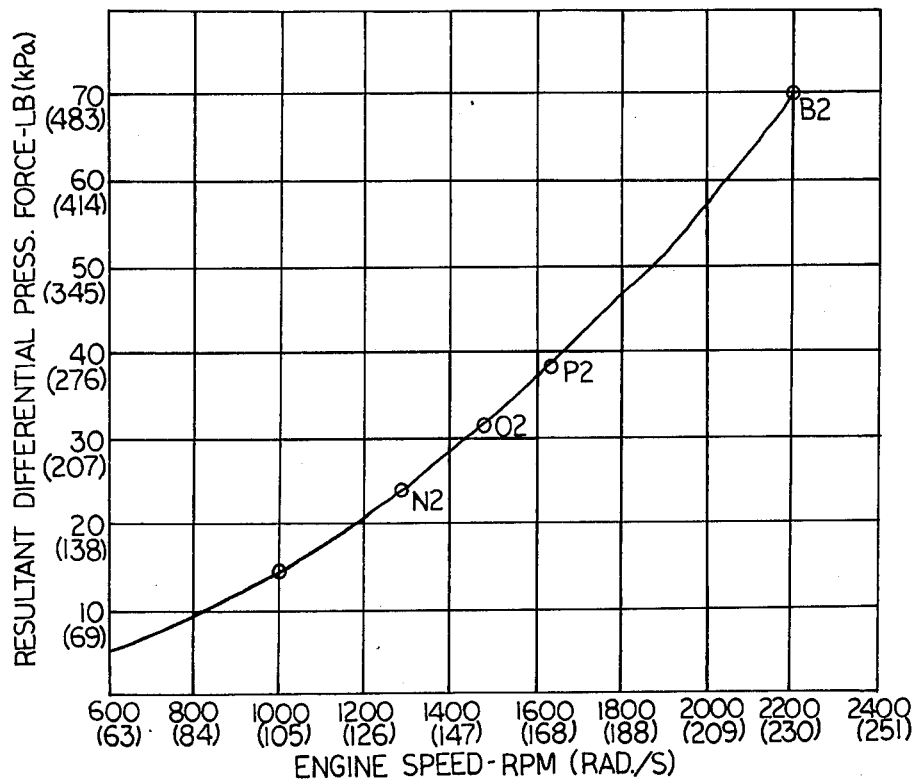
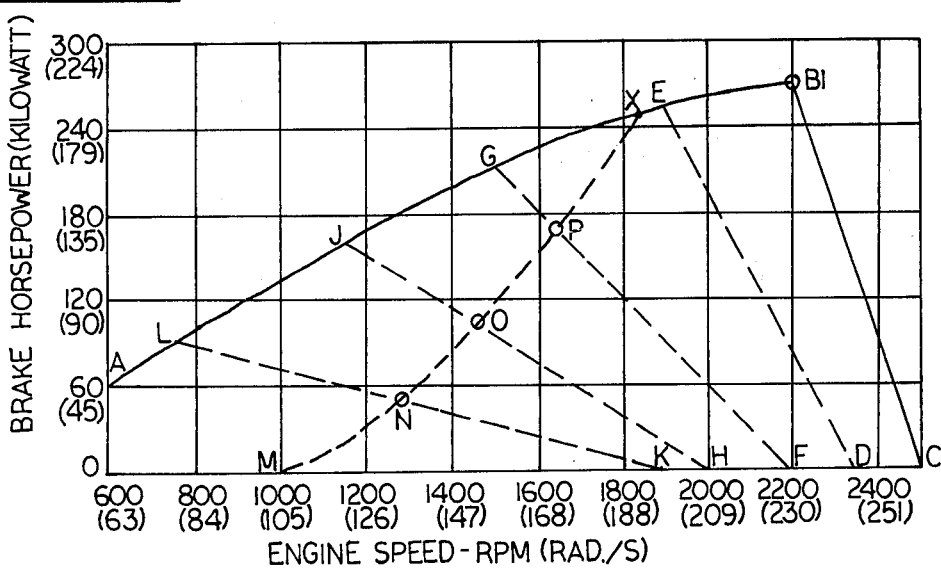

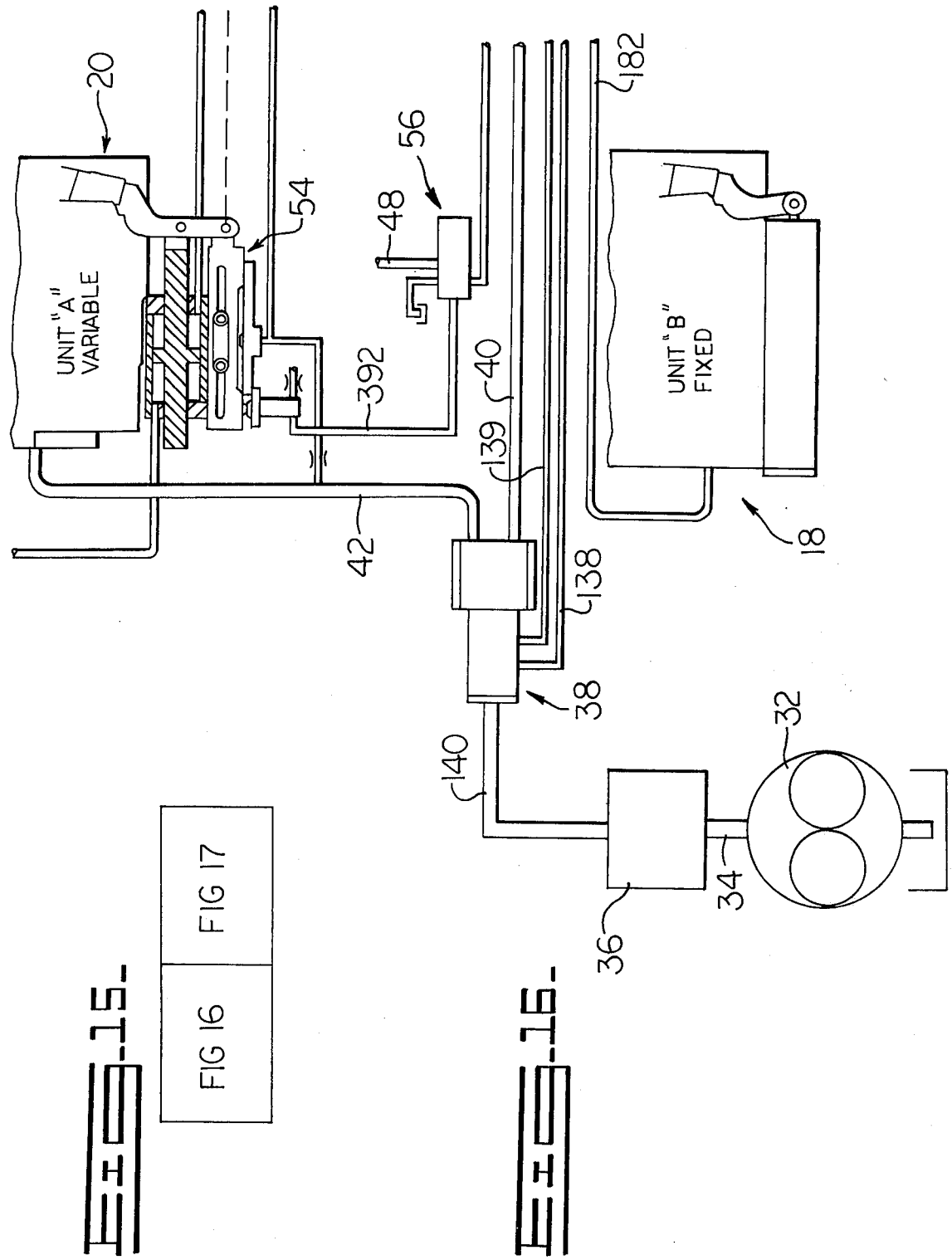

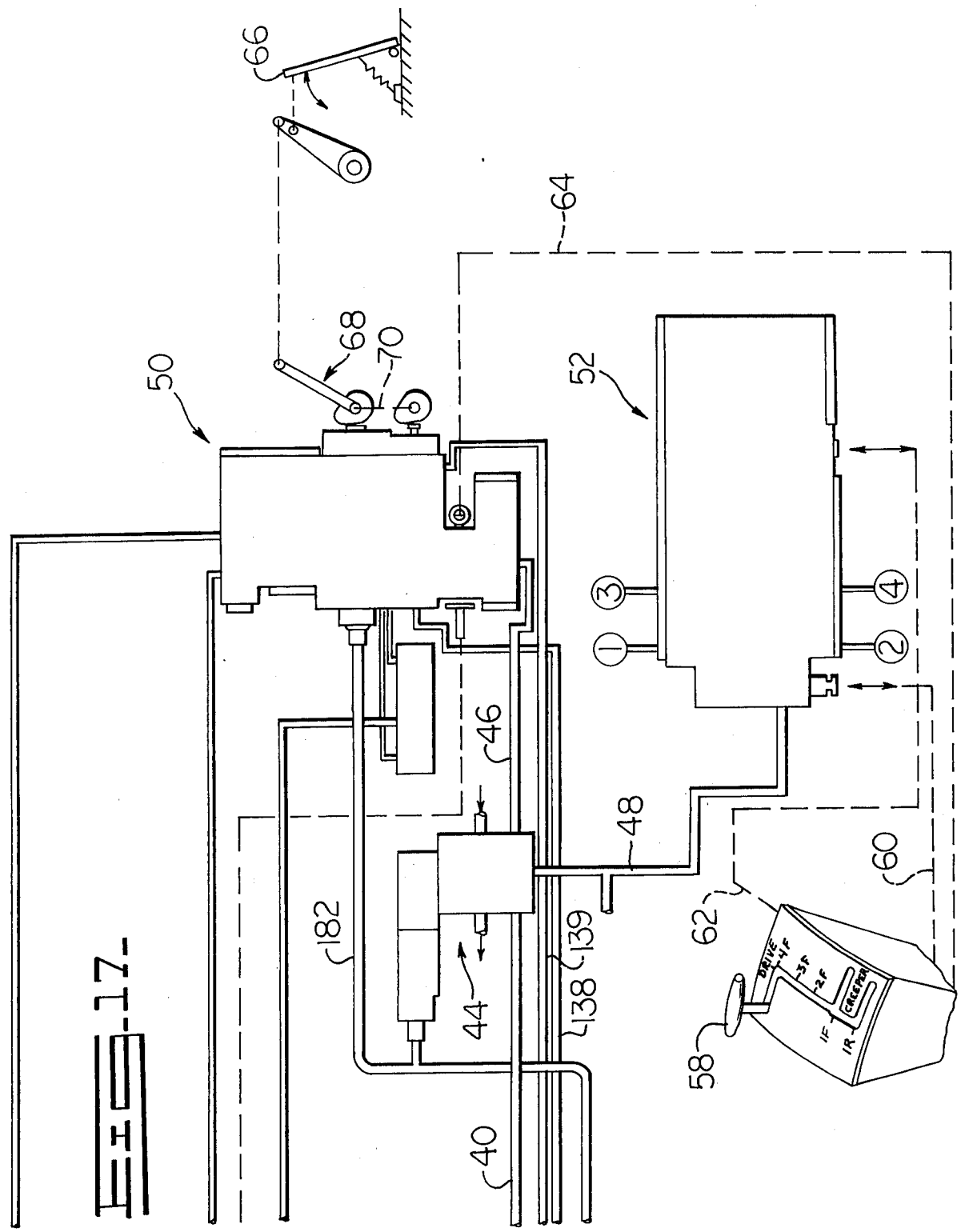

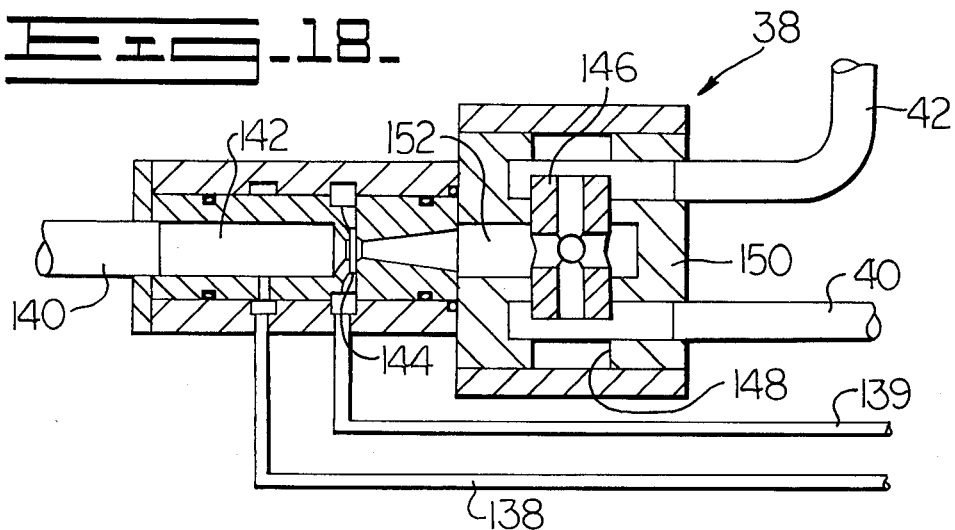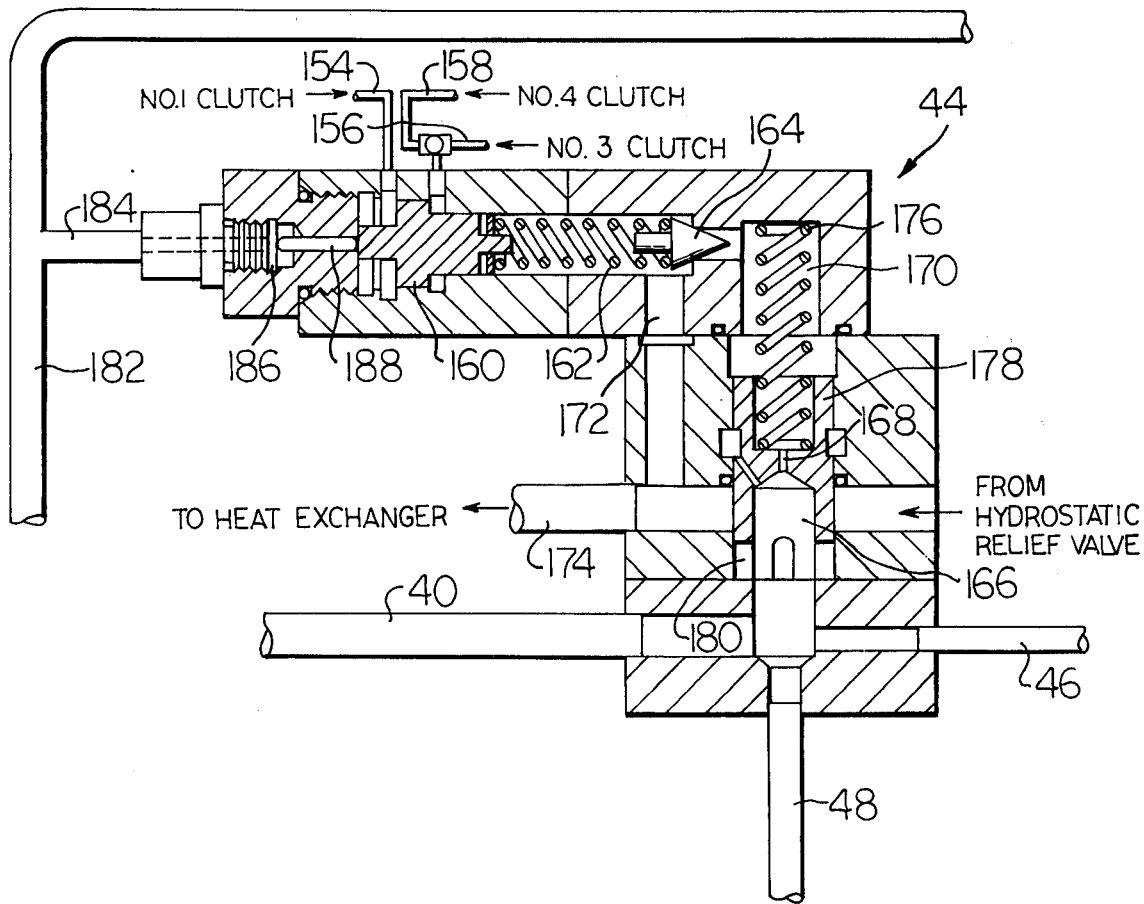

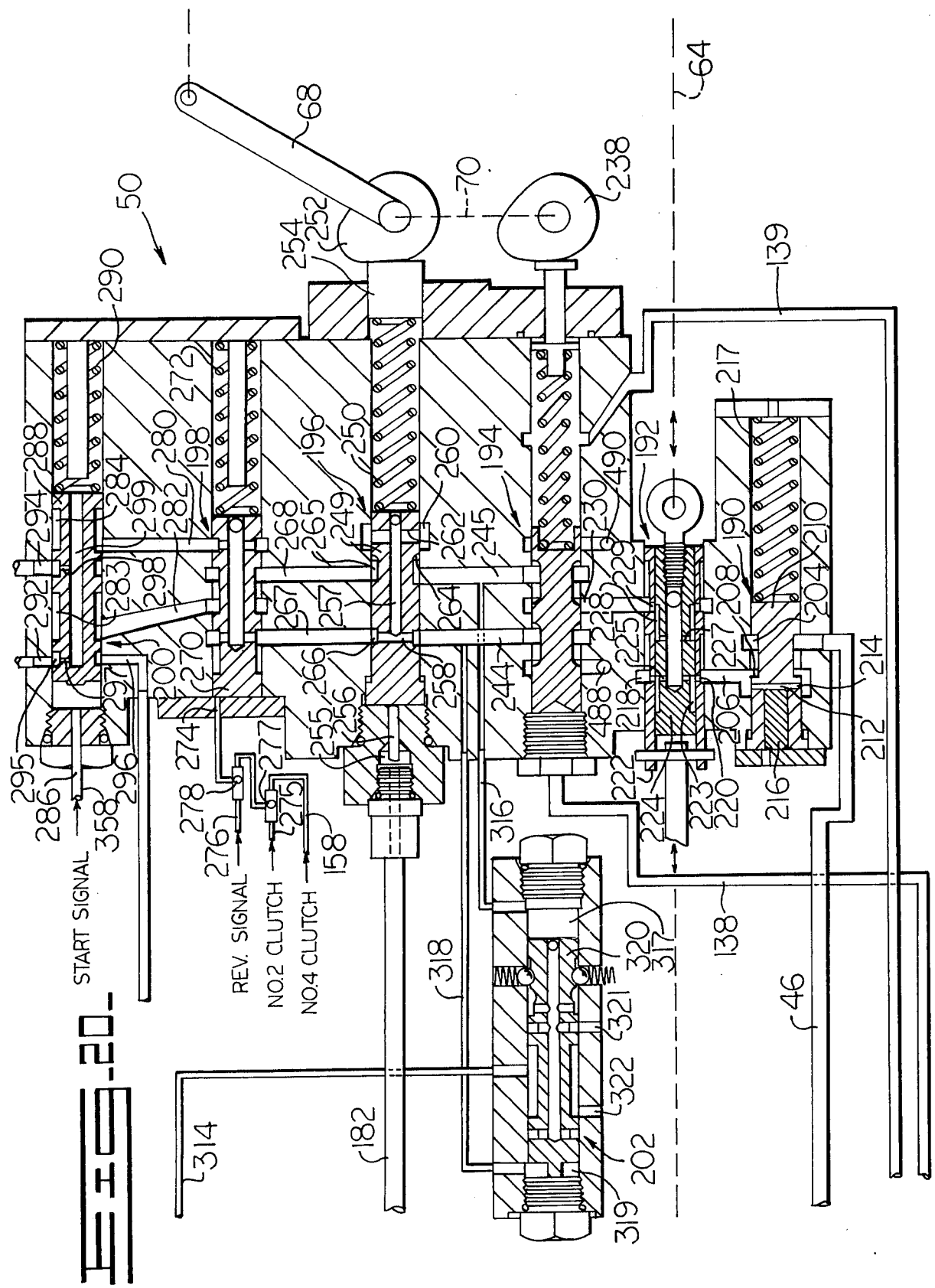

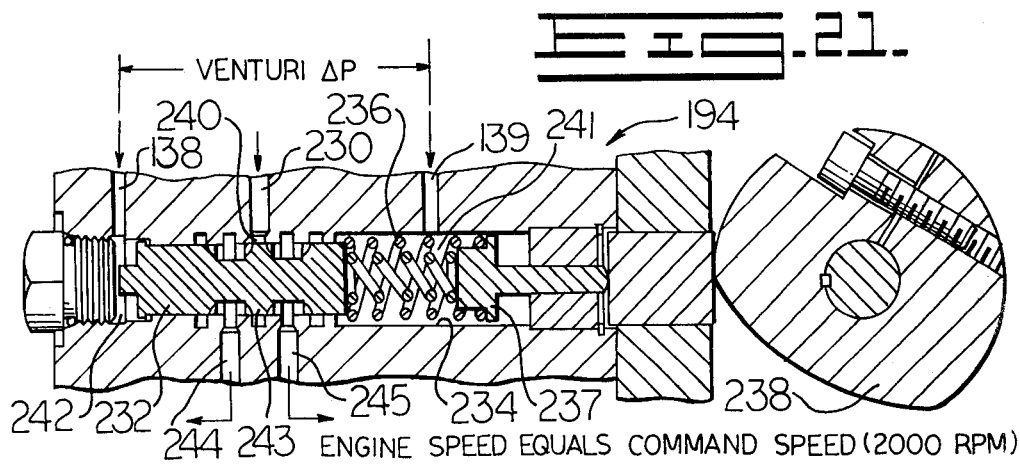
FIG. 21. ENGINE SPEED EQUALS COMMAND SPEED (2000 RPM)
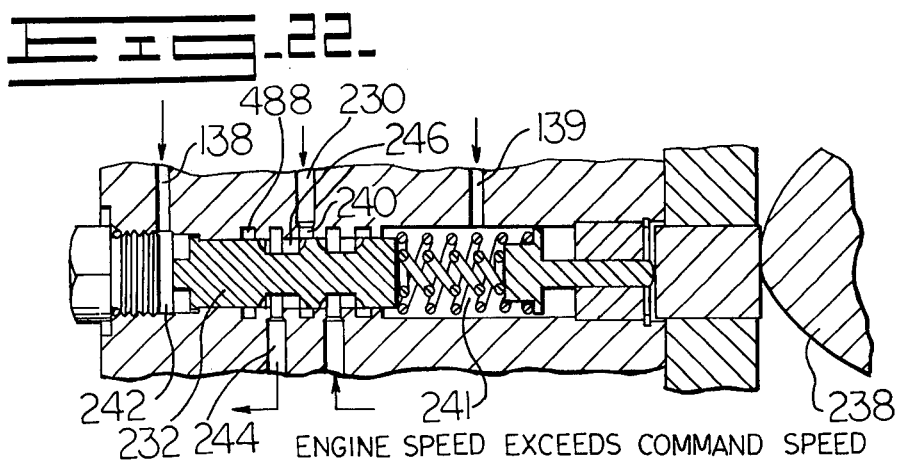
FIG. 22. ENGINE SPEED EXCEEDS COMMAND SPEED
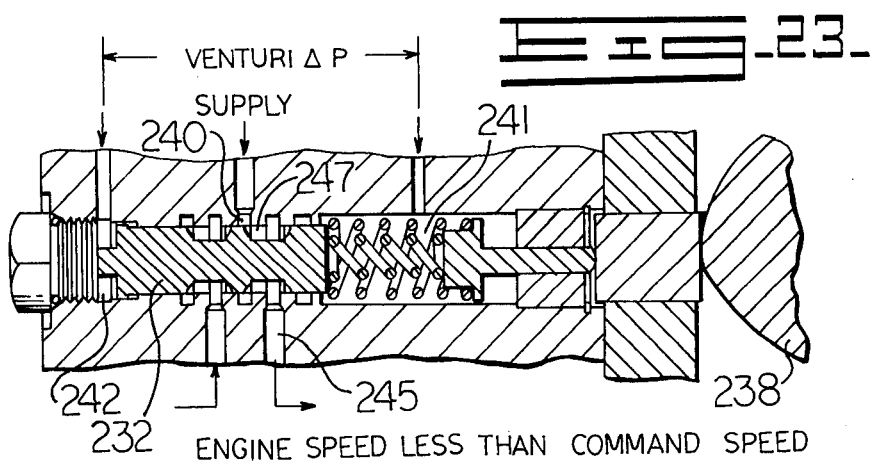
FIG. 23. ENGINE SPEED LESS THAN COMMAND SPEED

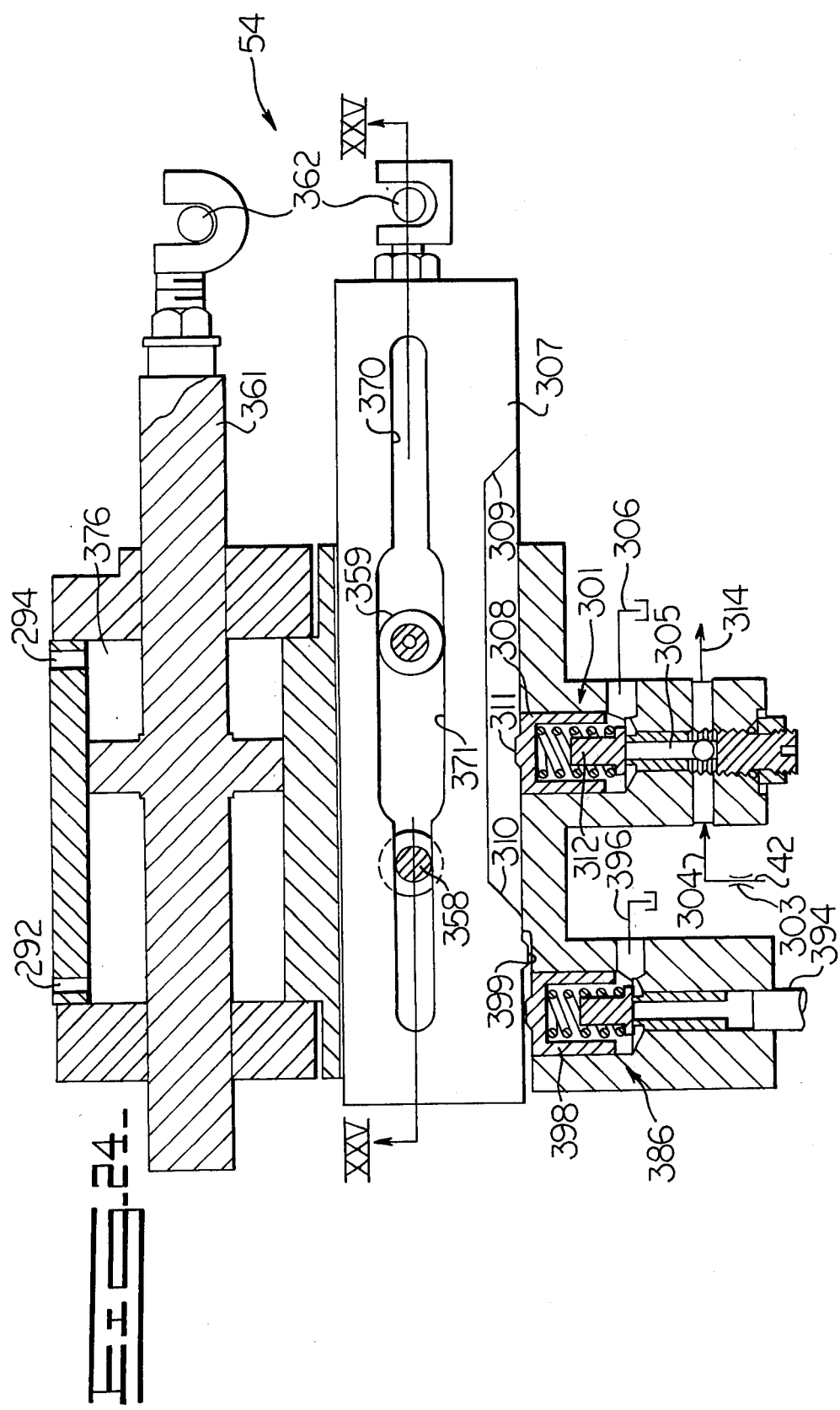

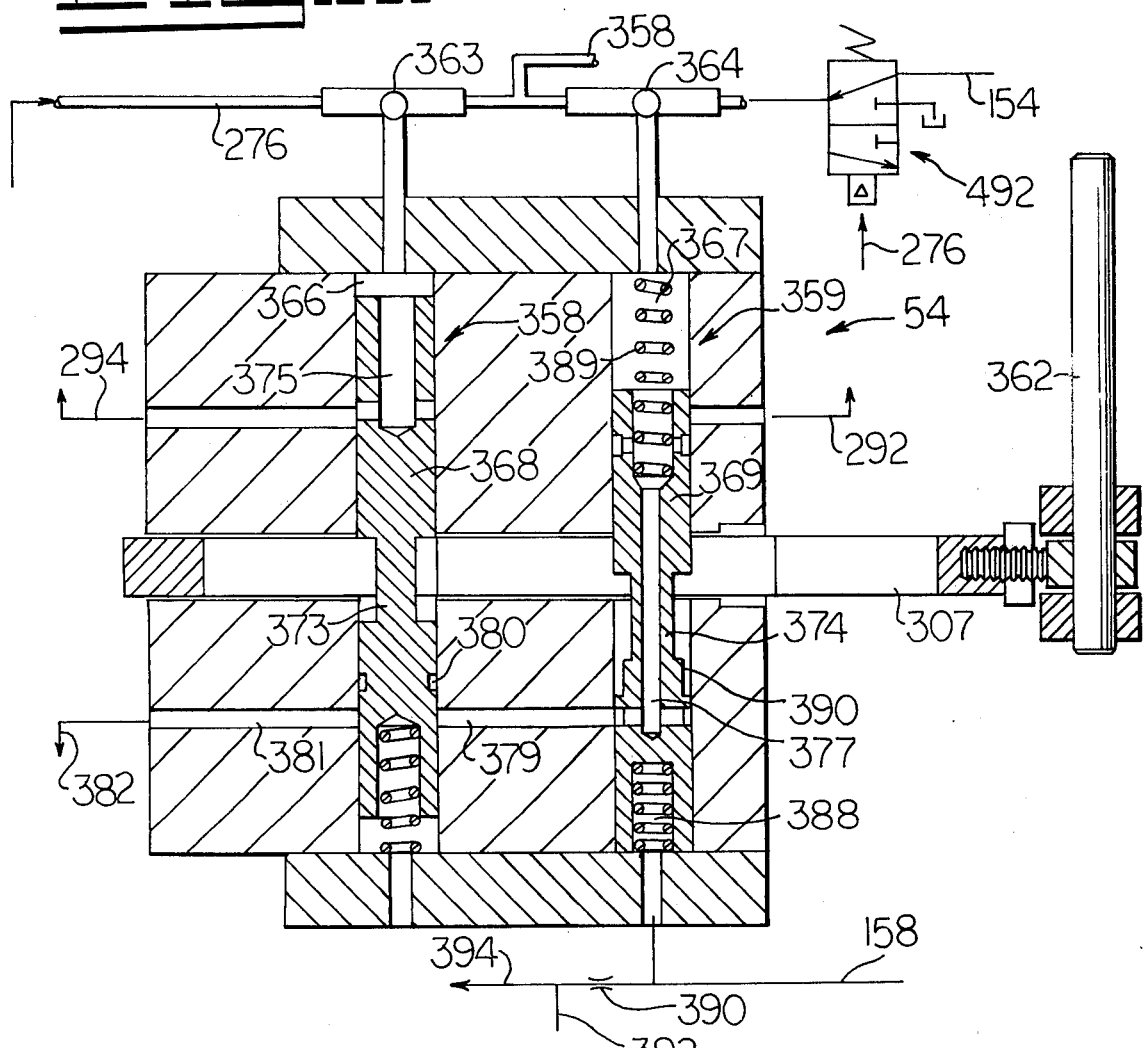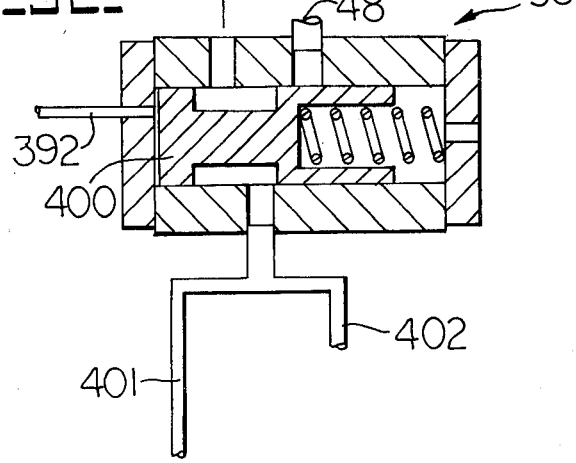

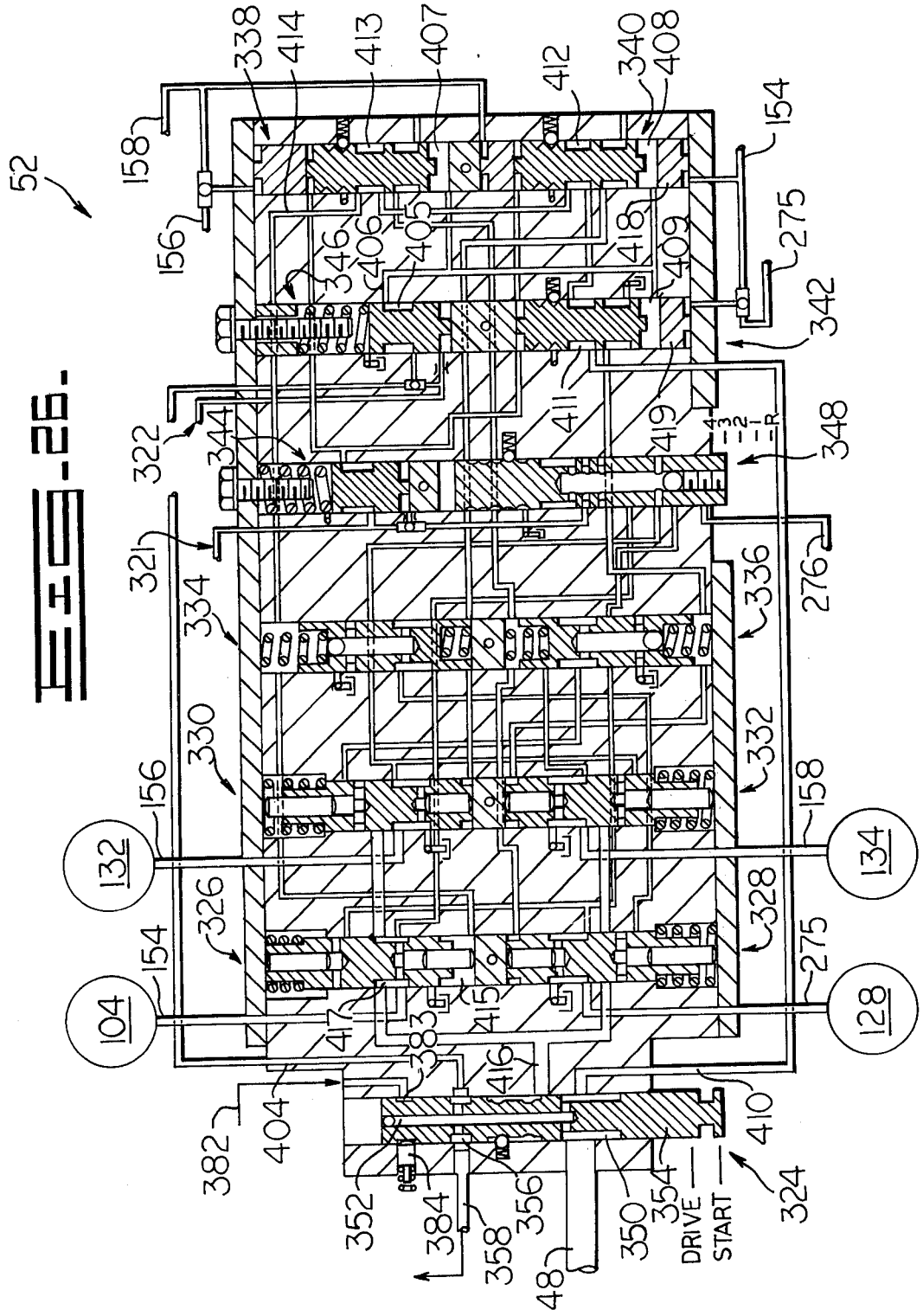

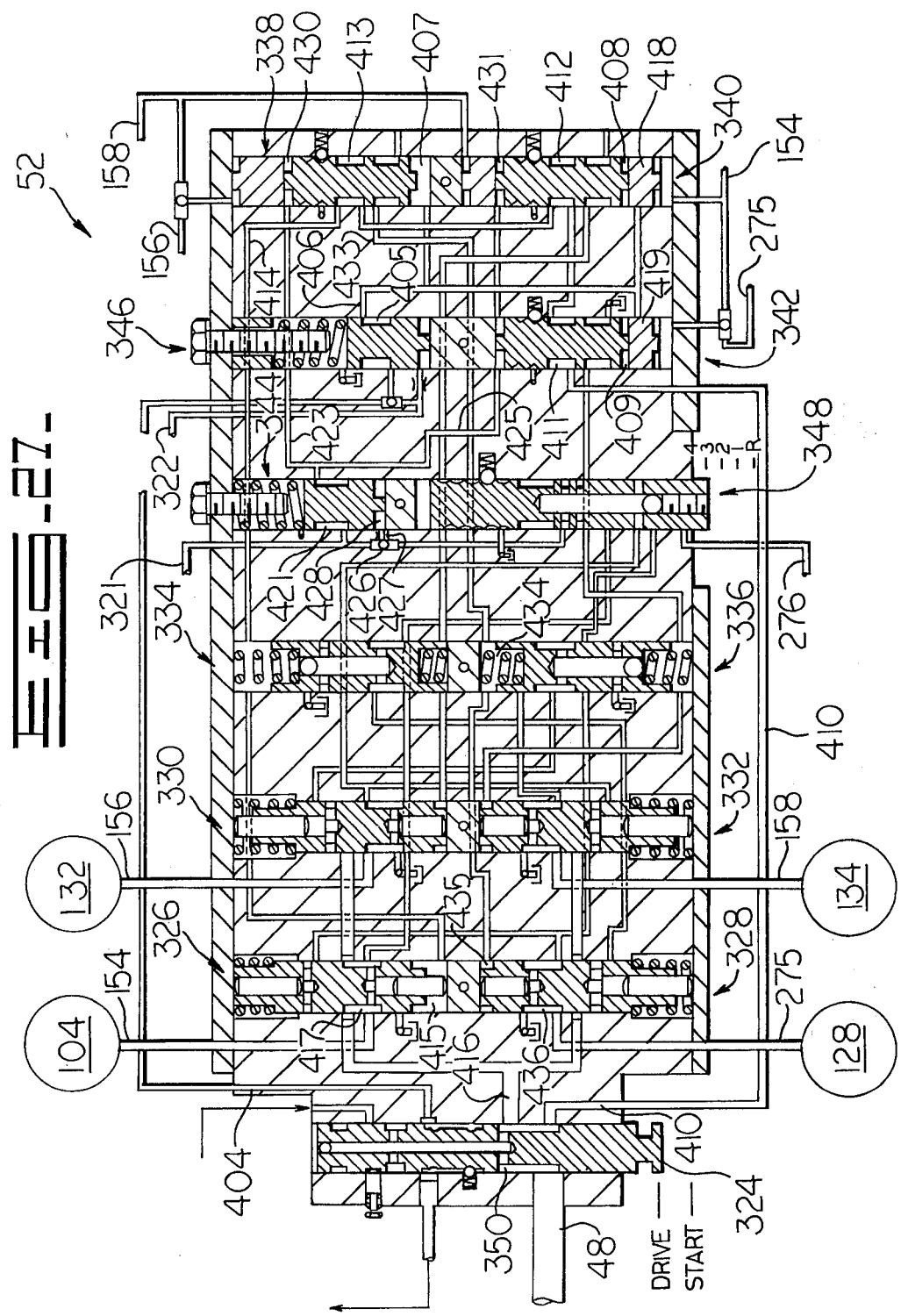

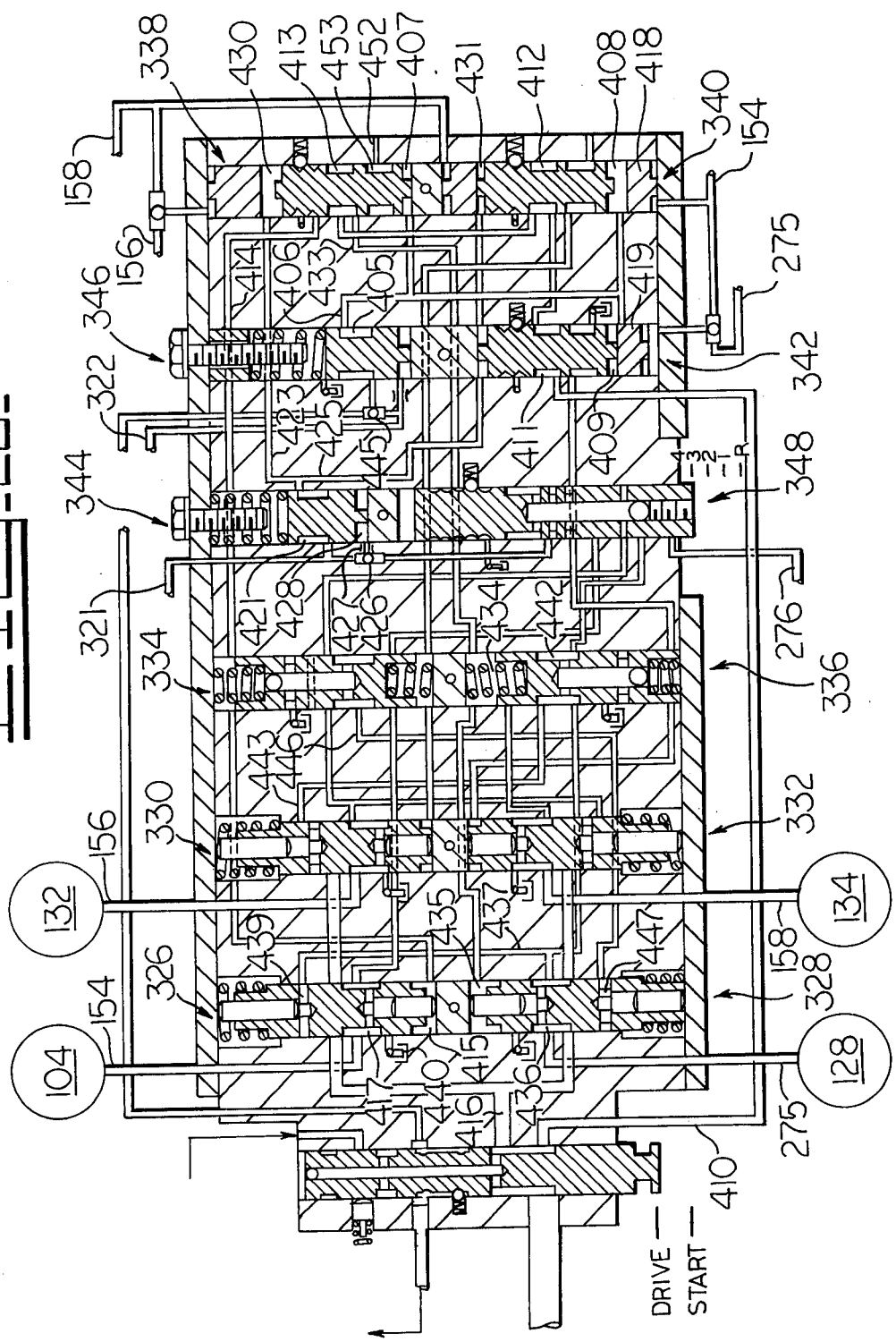

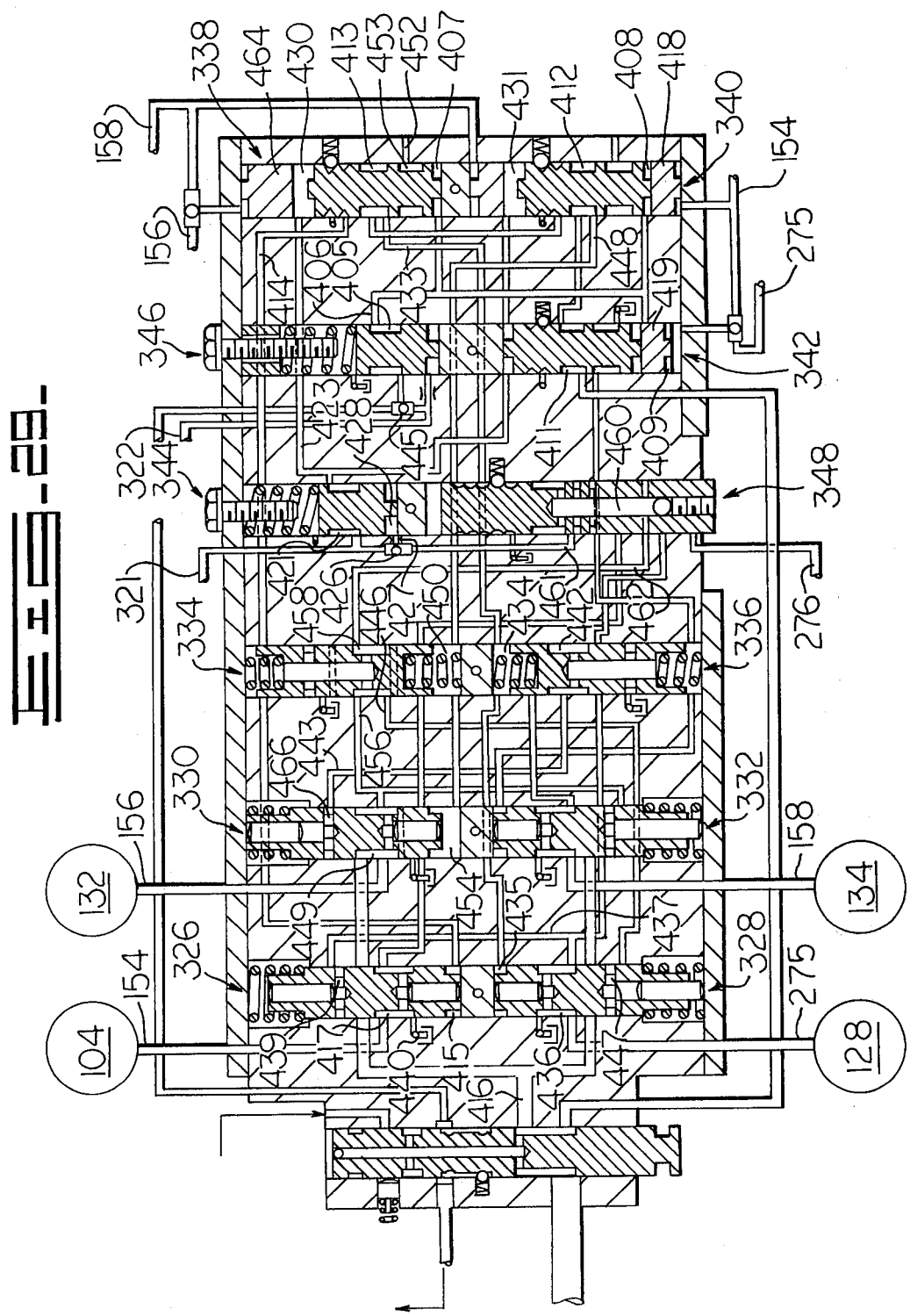

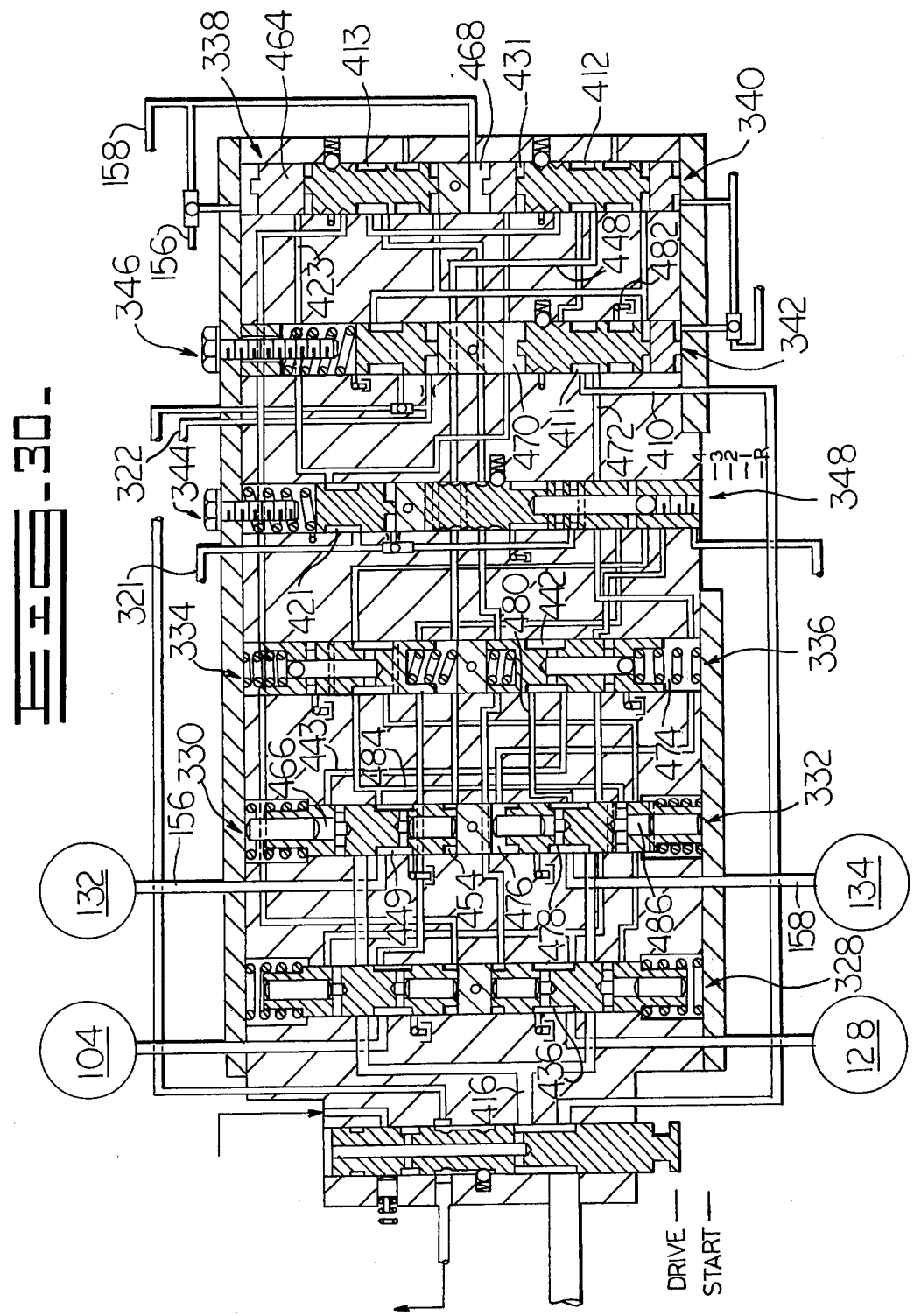

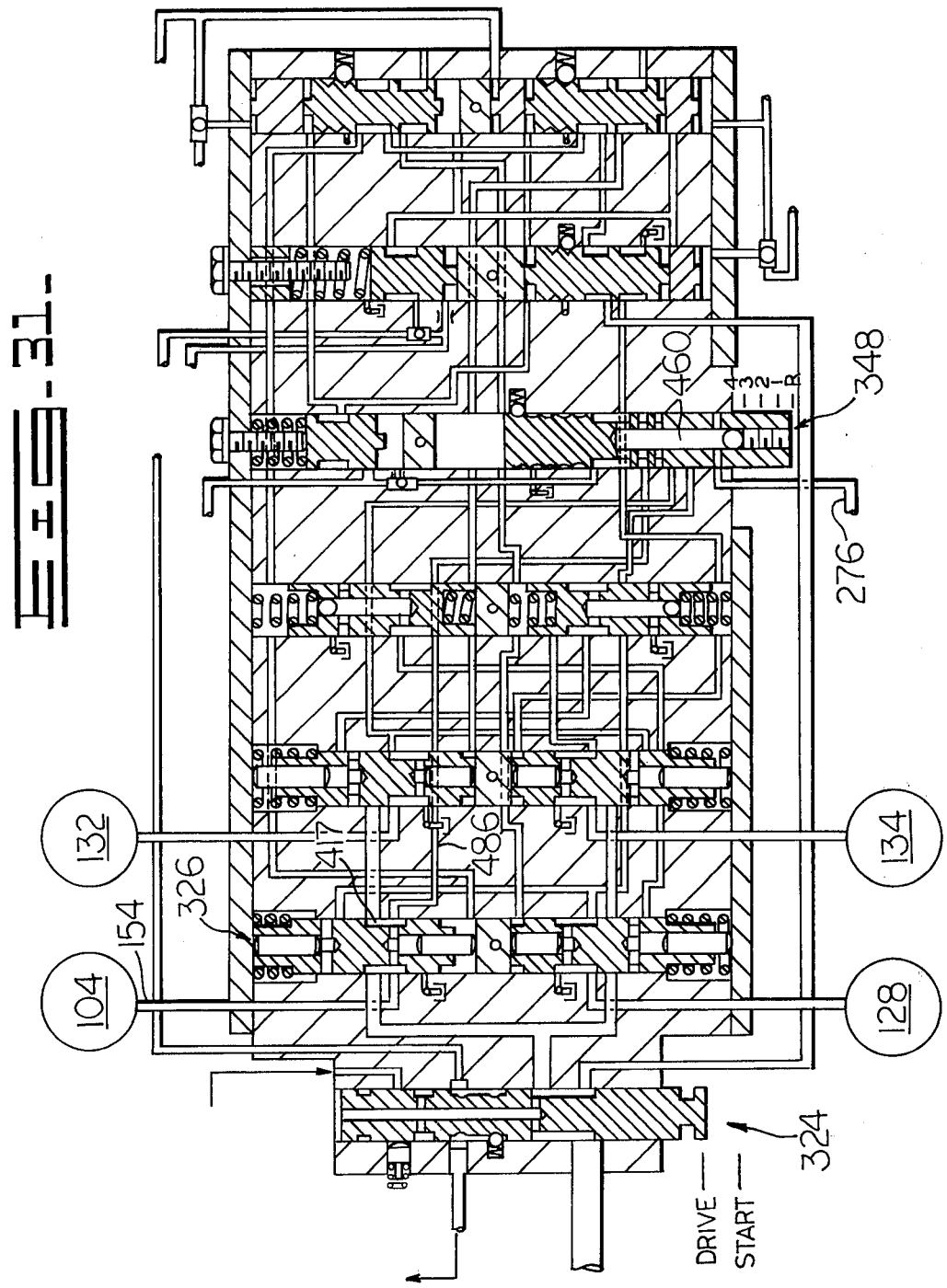

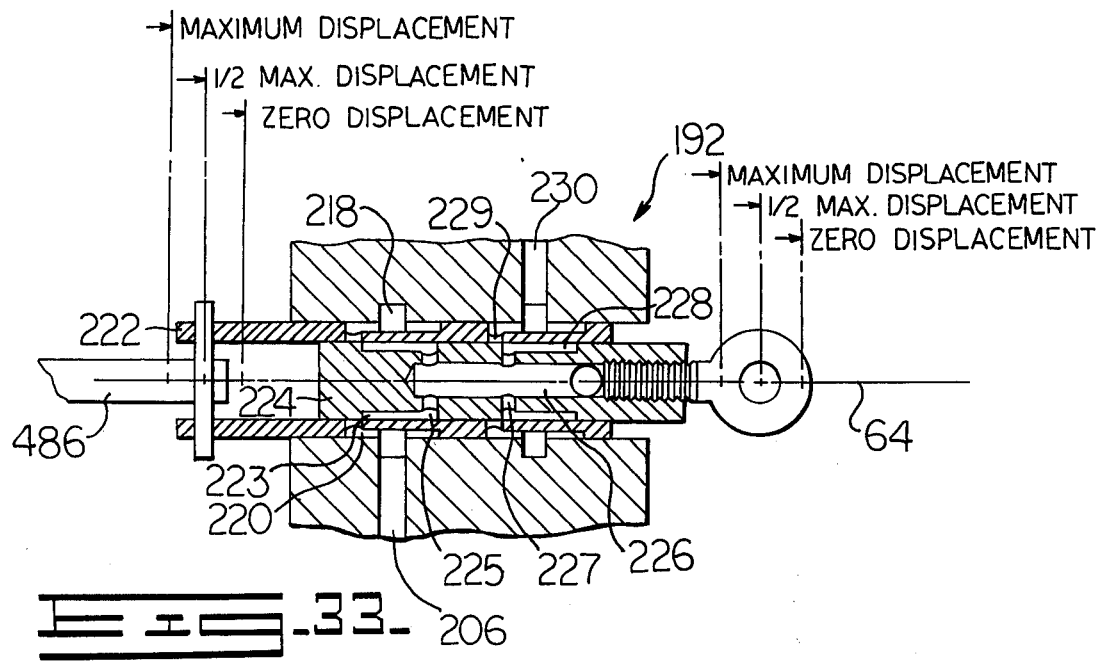

HYDROMECHANICAL TRANSMISSION

BACKGROUND OF THE INVENTION

The powering of heavy duty construction vehicles, large trucks, busses and so forth by diesel engines has presented several problems of transmission of torque from an engine, which efficiently produces power over a narrow speed range, to the drive wheels of the vehicle which of course must operate from a zero speed condition to a maximum speed condition. Consequently, transmission of the conventional gear train type are inefficient and difficult to operate when the vehicle engine is of the high power diesel type. The hydrostatic-mechanical type of transmission has been developed in order to allow vehicle engine speed to remain approximately constant through all ranges of vehicle speed. Such a transmission uses a combination of variable displacement pump-motors and a recycling planetary group driven by the vehicle engine through an input shaft, the pair of hydrostatic pumps coupled to reaction members of the recycling planetary group to provide a hydrostatic power path through the recycling group and in turn to the output gear train. Control of the displacement of the hydrostatic units and shifting of mechanical gear reduction trains in an output train provides the variable output torque. Generally speaking, one hydrostatic unit will act as a pump while the other hydrostatic unit acts as a motor to transmit power back through the recycling group. Range shifts in a mechanical gear train of the output section must occur when the elements of the output gear train are running at synchronous speed unless massive clutching members are to be included in the transmission. By synchronizing the range gear sets in the output gear train section, the designer may utilize "dog clutches" or brakes which are operated in a static condition rather than be engaged while one member is rotating at a different speed than the member to be engaged.

Hydrostatic transmissions in which the vehicle engine drives a variable displacement hydrostatic pump which in turn drives a hydraulic fixed displacement hydrostatic motor have required massive hydrostatic units in order to transmit the torque of a high power engine at low vehicle speeds directly to the vehicle wheels. Adding a conventional gear box with reduction gears permits the use of a smaller hydrostatic motor; thus the overall size of the transmission may be decreased. A limit is reached when the motor is required to operate at its maximum practical speed. These conditions define the minimum size motor of a given design that can be used in a configuration where all the power is transmitted through the hydrostatic units, with fixed-ratio gearing between the motor and the vehicle wheels. It follows that the smaller the hydrostatic unit, the lager the number of gear ranges that are required. This, in turn, increases the size of a transmission; accordingly a compromise must be reached between the size of the hydrostatic units and the reduction gear train assembly. By utilizing one variable displacement hydrostatic unit having an overcenter displacement, that is capable of reversing the fluid flow to the variable displacement unit; and, further driving the variable displacement unit directly from the input shaft gives the added capability of providing a fully hydrostatic reverse range thereby eliminating the necessity for a reverse gear train in the mechanical section.

Previous transmissions of this type have suffered disabilities in control systems, particularly in shifting at the synchronous points mentioned above. Further disabilities in control systems for transmissions of this type have been found in maintaining a constant engine speed and in limiting pressure in the hydraulic loop coupling the two hydrostatic devices. Such over-pressure in this loop occurs when an overzealous operator demands an excessive torque in acceleration or deceleration of the vehicle.

SUMMARY OF THE INVENTION

The transmission and control system described herein in a unique combination of a variable displacement hydrostatic pump-motor and a fixed displacement hydrostatic pump-motor coupled with a multi-range planetary system offering an infinitely variable transmission ratio from a zero speed condition to a maximum speed condition. The fully automatic control system provides certain necessary and desirable over-ride capabilities enabling the operator to control output torque to best meet differing operating conditions. Engine speed is maintained within an efficient range providing maximum output of horsepower while utilizing a minimum of range gear changes. The preferred embodiment is comprised of two simple planet trains, the reaction elements being controlled by two brakes, and a four element recycling planetary unit with two output members each engaged by two rotating clutches. Such an arrangement provides the primary object of the transmission, that is a transmission having a constant input speed while providing an output speed varying from zero to a maximum speed at maximum available torque commensurate with the engine speed throughout such output speed range.

It is a further object of this invention to provide a transmission for engine driven vehicles having a minimum overall size.

It is still another object of this invention to provide a hydrostatic mechanical transmission having a fully hydrostatic low range in which continuous variation from forward to reverse including zero speed is accomplished by displacement of the variable displacement hydrostatic unit in a direction opposite that utilized in the fully hydrostatic low forward range.

Another object of this invention is to provide a hydrostatic mechanical transmission having a fixed displacement hydrostatic unit and a variable displacement hydrostatic unit in which one of the units will act as a pump while the other unit acts as a motor, these functions reversing so that the first unit will act as a motor and the second unit will act as a pump at substantially the middle of the range in each specific range of the output mechanical gear train.

It is an object of this invention to provide a control system which requires a minimum of operator command functions while providing automatically a reduction ratio in the transmission to operate the vehicle in the most efficient manner.

It is a further object of the control system to provide a comparison between actual engine speed and commanded engine speed while controlling the displacement of the variable displacement hydrostatic unit and engaging range clutches all in response to such a comparison.

It is a further object of the control system of this invention to ensure that range clutches are engaged and disengaged in the proper sequence so as to provide smooth shifts with uninterrupted output torque under all conditions.

It is still another object of this control system to provide for disengagement of the hydrostatic drive path upon attaining zero displacement in the variable displacement hydrostatic unit while the fourth range clutch is engaged.

Broadly stated, the invention discloses a hydromechanical transmission system for an engine driven vehicle comprising an input shaft driven by the vehicle engine and an output shaft driving the vehicle, a variable displacement hydrostatic pump-motor driven by the input shaft, and a fixed displacement hydrostatic pump-motor hydraulically coupled to the variable displacement pump-motor, the variable displacement pump-motor acting as a pump while the fixed displacement pump motor is acting as a motor and conversely the variable displacement pump-motor acting as a motor in cooperation with the engine driving the input shaft while the fixed displacement pump-motor is acting as a pump. Also included is a hydrostatic drive group comprising a planetary gear assembly, having an input member driven by the fixed displacement hydrostatic pump-motor, and an output member driving connected to the output shaft, a reaction member, and a reaction brake means for selectively locking the reaction member. Further, the transmission system includes a hydromechanical drive group comprising a split torque recycling planetary group having an output assembly, a plurality of output drive engagement means for drivingly connecting the output assembly of the output shaft, and a reaction member. In the hydromechanical drive group, when the variable displacement hydrostatic pump-motor is acting as a motor the input member is driven by the input shaft and by the variable displacement hydraulic pump-motor while the reaction member drives the fixed displacement hydraulic pump-motor acting as a pump, and when the variable displacement hydraulic pump-motor is acting as a pump the input member is driven by the input shaft while the reaction member is driven by the fixed displacement hydrostatic pump-motor. The system includes a control assembly comprising sense means for sensing engine speed, means responsive to the sense means for engaging one of the plurality of output drive engaging means, means responsive to the sense means for actuating the reaction brake means, and means responsive to the sense means to vary the displacement of the variable displacement hydraulic pump motor.

These and other objects of the invention will become apparent from a study of the following specification and drawings.

BRIEF DESCRIPTION OF THE DRAWINGS

FIG. 13 is a graph of the differential pressure resulting from various engine speeds, such differential pressure measured in a venturi on the output side of the hydraulic pump.

FIG. 14 is a graph of output brake horsepower plotted against engine speed.

FIG. 15 illustrates the relation of FIG. 16 and FIG. 17.

FIG. 16 and FIG. 17 are schematics of the control system.

FIG. 18 shows the venturi and flow divider valve.

FIG. 19 shows the variable relief valve.

FIG. 20 illustrates the pump actuator control group.

FIGS. 21, 22 and 23 are sectional views showing operation of the variable underspeed valve of the pump actuator control group.

FIG. 24 illustrates the pump actuator group.

FIG. 25 is a cross-section of FIG. 24 taken at XXV—XXV.

FIG. 26 is a sectional view of the clutch control group with the mode selector valve in the start position and no clutches engaged.

FIG. 27 is a sectional view of the clutch control group showing the mode selector valve in the drive position and the range limiter control valve in third forward range with the first range forward clutch engaged.

FIG. 28 is a sectional view of the clutch control group showing the mode selector valve in the "drive" position and the range limiter valve in the third forward range with the second range forward clutch engaged with receipt of an upward signal at the end of the first forward range.

FIG. 29 is a sectional view of the clutch control group showing the mode selector valve in the "drive" position and the range limiter control valve in third forward range with the third range clutch engaged and an upshift signal at the end of the second forward range.

FIG. 30 is a sectional view of the clutch control group showing the mode selector valve in the "drive" position and the range limiter control in fourth forward range, with the fourth range clutch engaged and the upshift signal at the and of the third forward range.

FIG. 31 is a sectional view of the clutch control group showing the mode selector valve in the "drive" position and the range limiter control valve in reverse.

FIG. 32 shows a sectional view of the lockup clutch control group.

FIG. 33 shows the creeper control valve.

DETAILED DESCRIPTION OF THE DRAWINGS

Figure 1:
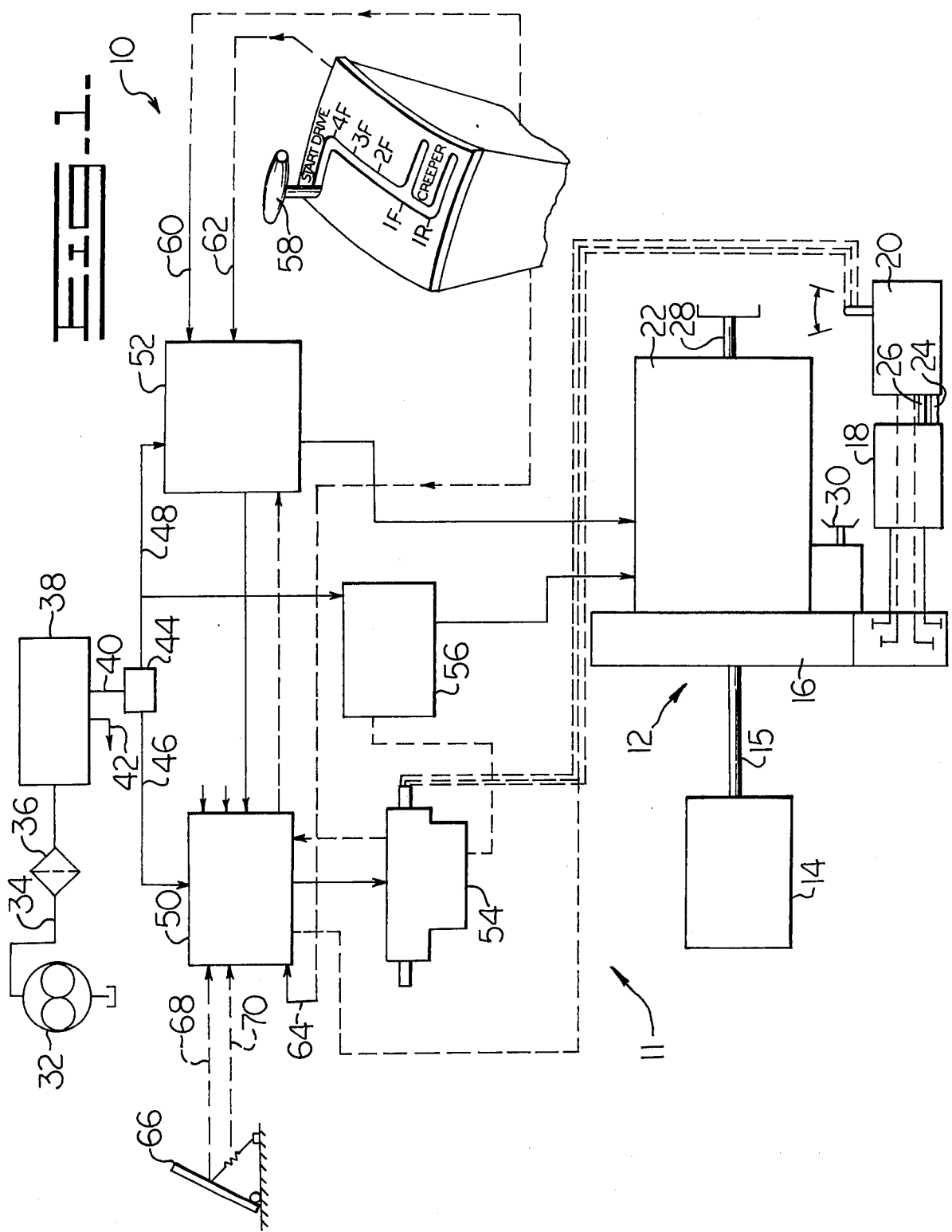
FIG. 1 is a schematic diagram of the transmission and control system which is the subject of this invention.

Referring to FIG. 1, a hydromechanical transmission 10 for a vehicle is shown having a control section 11 and a transmission section 12. The transmission section 12 is driven through input shaft 15 by engine 14. Input shaft 15 provides torque to a transfer gear section 16, transfer gear section 16 driving variable displacement hydrostatic pump-motor 20 and a planetary system 22. A fixed displacement hydrostatic pump-motor 18 is drivingly connected to the planetary system 22 and hydraulically connected to the variable displacement hydrostatic pump-motor 20 by conduit 24 and conduit 26. Output ot the vehicle wheels is provided by output shaft 28. A power take-off 30 may alternatively be provided and driven by transfer gear section 16.

The control section 11 comprises an engine driven hydraulic pump 32 providing fluid through conduit 34, to filter 36 then to a sence means comprised of venturi and flow divider group 38 where engine speed is sensed and where hydraulic fluid is supplied through conduit 42 to replenish the hydrostatic drive system loop. Fluid is also provided from venturi and flow divider group 38 via conduit 40 to a variable relief valve 44 providing differing pressures for the various drive and engagement means where it is further divided to conduit 46 and conduit 48; conduit 46 communicating with pump actuator control group 50 and conduit 48 communicating with clutch control group 52. Pump actuator control group 50 responsive to the sense means of venturi and flow divider group 38 compares sensed engine speed to an engine speed commanded by the operator to control displacement of the variable displacement hydrostatic pump-motor 20 by actuator group 54, while clutch control group 52 responsive to pump actuator control group 50 provides necessary control of drive engaging means in planetary system 22. A lock-up clutch control group 56 is responsive to actuator group 54 to provide a pure mechanical power path in the highest range of the planetary system.

Operator input to this system is provided by selector lever 58 providing mode selection signals (i.e. forward and reverse) to clutch control group 52 by linkage 60. Selector level 58 further provides range limiter signals to clutch control group 52 by linkage 62. In the first forward range, selector lever 58 may be utilized by the operator to provide creeper control to pump actuator group 50 via linkage 64. A foot pedal 66 allows the operator to establish an engine command speed through linkage 68 while limiting maximum hydrostatic pressure in the hydrostatic driven system loop through linkage 70.

Having generally described the hydromechanical transmission system 10, the transmission section 12 will be described in detail followed by a detailed description of control section 11.

TRANSMISSION

Figure 2:
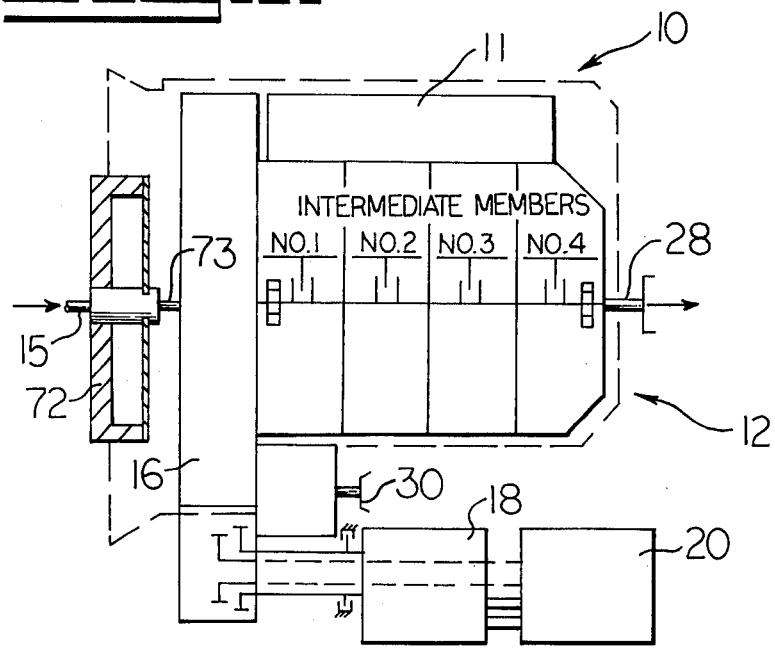
FIG. 2 shows a schematic of the preferred embodiment of the hydromechanical transmission of this invention.
Figure 3:
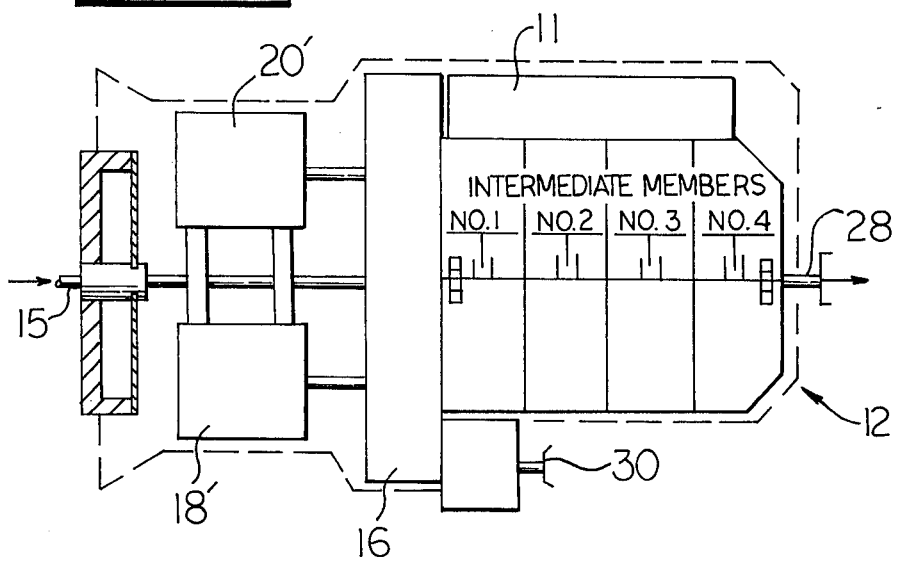
FIG. 3 illustrates an alternate embodiment of the same transmission with the hydrostatic units mounted radially.

Referring to FIG. 2, transmission section 12 is shown schematically driven by input shaft 15. FIG. 2 illustrates the preferred embodiment of the invention wherein fixed hydrostatic pump-motor 18 and variable hydrostatic pump-motor 20 are located axially adjacent to the planetary housing to offer a shorter overall length and improved serviceability. Location of variable hyrostatic pump-motor 20' and fixed hydrostatic pump-motor 18' as shown in FIG. 3, illustrate an alternate embodiment wherein the hydrostatic units may be positioned radially about the input member.

Figure 4:
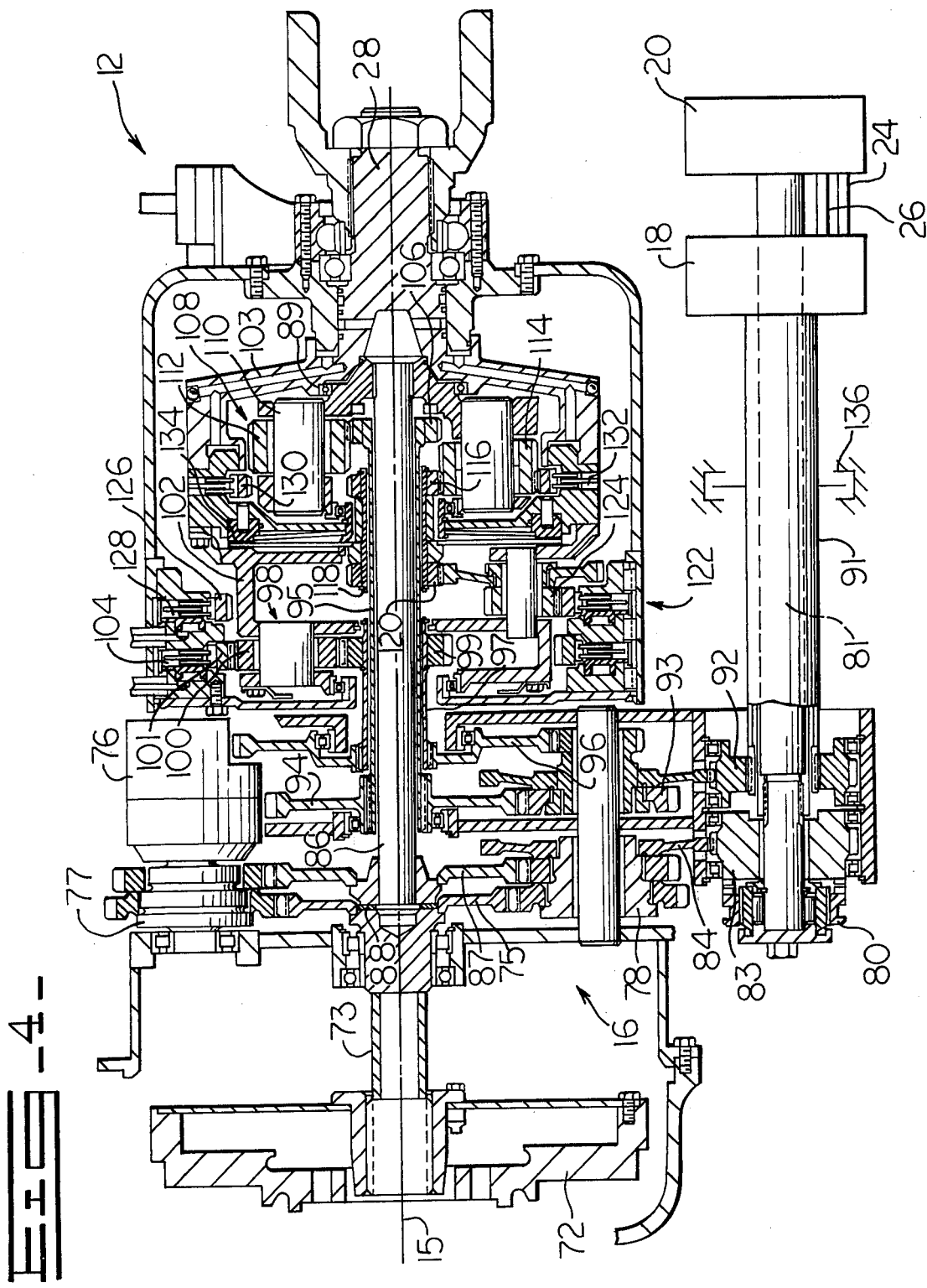
FIG. 4 is a view of the transmission partly in section and partly in schematic.

Referring to FIG. 4, a general layout of the preferred embodiment of transmission section 12 of this invention is shown. Input is provided at shaft 15 to a flywheel 72 and transmitted via shaft 73 to transfer gear section 16 through gear 75. Gear 75 drives hydraulic supply pump 76 through cluster gears 77, and further provides power to variable displacement hyrostatic pump-motor 20 through cluster gears 78. Drive of variable hydrostatic pump-motor 20 is accomplished by means of clutch 80 and shaft 81 through gear 83 which in turn is driven by spur gear 84 of cluster 78. Clutch 80 allows disengagement of variable displacement hydrostatic pump-motor 20 at high output speeds. A mechanical power path is provided from gear 75 through cluster gear 78 to shaft 86 by spur gear 87. Shaft 86 is axially located between spacer 88 and thrust bearing 89.

Fixed displacement hydrostatic pump-motor 18 when acting as a motor drives shaft 91 and a gear train comprised of spur gear 92 and cluster gears 93. Cluster gears 93 drive spur gear 94 mounted on coaxial shaft 95, additionally cluster gears 93 drive spur gear 96 which, in turn, is mounted on shaft 97, shaft 97 mounted coaxially about coaxial shaft 95 which is mounted coaxially about shaft 86. Shaft 97 drives first range planetary group 98 through first sun gear 99. First range planetary group 98 comprises sun gear 99, a plurality of planet gears 100 and ring gear 101, first planet gears 100 being mounted on primary carrier 102 which is drivingly connected to output shaft 28 by means of flange member 103. Ring gear 101 is provided with first drive engagement means 104 which in the preferred embodiment is a conventional braking device to stop rotation of the ring gear 101, ring gear 101 acting as the reaction mixture in first planetary group 98.

Coaxial shaft 95 has mounted thereon sun gear 106, a member of recycling planetary group 108. Recycling planetary group 108 is further comprised of a recycling planetary carrier 110 having mounted thereon a plurality of first recycling gears 112 and intermeshing therewith and also mounted on recycling planetary carrier 110 are a plurality of second recycling planet gears 114. The first recycling planet gears 112 intermesh with sun gear 106 mounted on shaft 95, the second recycling planet gears 114 in intermeshing relationship with a second sun gear 116 mounted on coaxial shaft 118. Mounted at the opposite end of coaxial shaft 118 is sun gear 120 of second planetary group 122. Second planetary group 122, which may be omitted from the transmission, is comprised of sun gear 120 a plurality of second planet gears 124, second ring gear 126, and second intermediate drive engagement means 128, the plurality of second planet gears 124 being mounted on primary carrier 102. Second drive engagement means 128 is of the conventional brake type for stopping rotation of the ring gear 126, ring gear 126 acting as the reaction member in second planetary group 112, to cause primary carrier 102 to act as the output drive member which in turn drives flange member 103 drivingly connected to output shaft 28.

Recycling planetary group 108 further comprises ring gear 130 drivingly engaged with second recycling planet gears 114 and engageable with primary carrier 102 by third range drive engagement means 132. A fourth range drive engagement means 134 is provided to drivingly engage shaft 118, which is driven by sun gear 116, to primary carrier 102 which in turn drives flange member 103 and output shaft 28.

A brake means 136 is provided to selectively stop rotation of shaft 91 leading to fixed displacement hydrostatic pump-motor 18. Although the purpose of brake means 136 will become more evident in the discussion of the operation of the transmission, suffice it to say that in the higher range of the fourth range forward drive condition fixed hydrostatic pump-motor 18 and variable displacement hydrostatic pump-motor 20 are isolated by the control system from the transmission by brake means 136 and clutch means 80 respectively.

Operation of transmission 12 will be covered at this point in order to more fully understand the operation of the control section which follows. A split torque recycling transmission of the type described above provides a means to multiply input torque of an engine over an infinitely variable range. Combination of a hydrostatic drive means and a differential gear arrangement allows for smaller hydrostatic pump motors while retaining the infinitely variable reduction ratio of the hydrostatic drive section.

Figure 12:
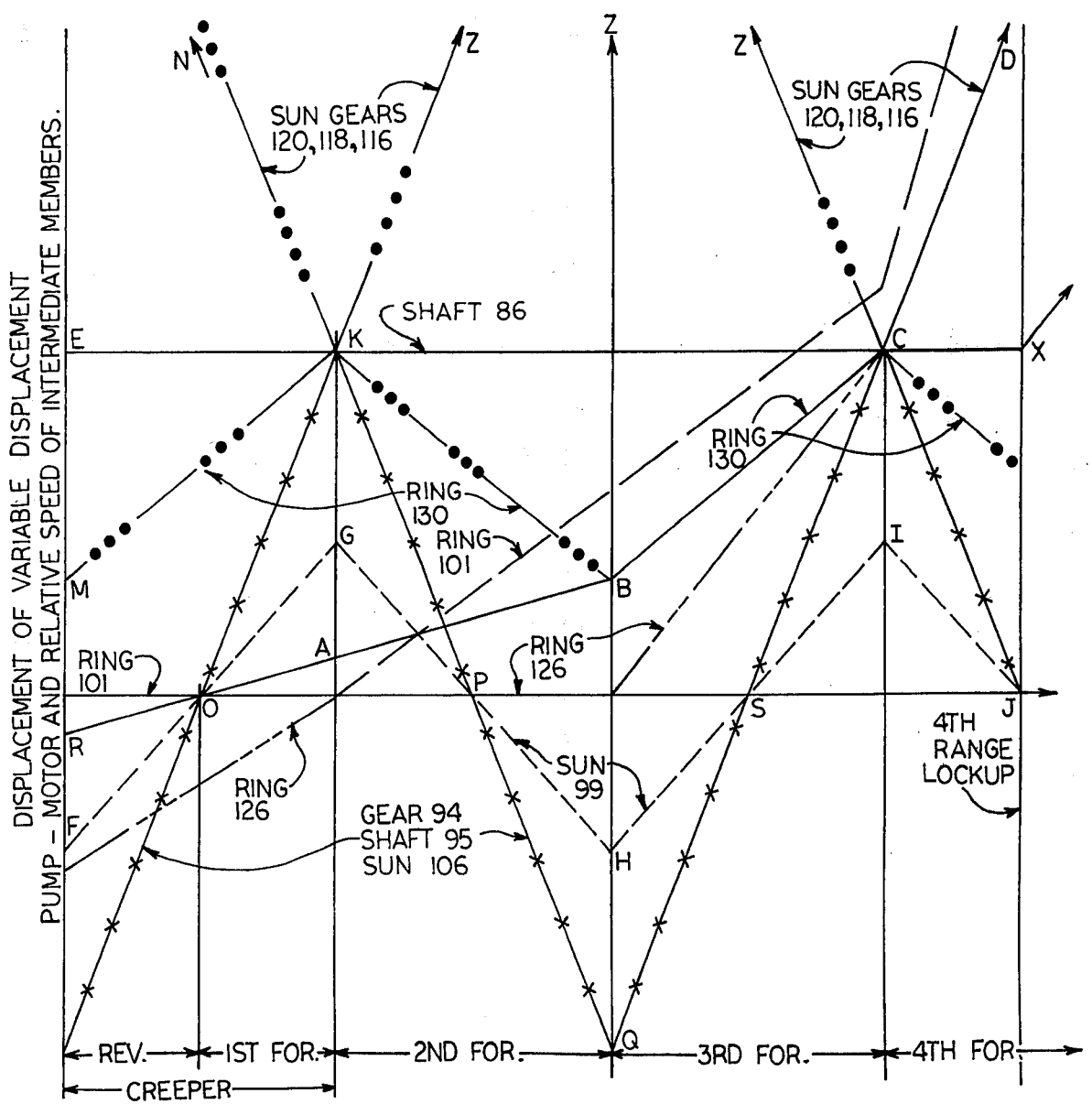
FIG. 12 is a graphical description of the speed of all the intermediate units overlaid on a graphical depiction of displacement of the variable displacement unit.

Referring to FIG. 12, the relative speed of intermediate planetary members is plotted as a function of displacement of the variable displacement hydrostatic pump motor, both being ordinates, the abscissa indicating the particular range gear engaged. Solid R-O-A-B-C-D indicates the speed of output shaft 28 with point 0 indicating a zero output speed and point R indicating a maximum reverse speed, thus, speeds to the right of point O on solid line O-A-B-C-D indicate forward speeds of the vehicle. Solid line E-X indicates a constant speed of input shaft 86. Broken line F-O-G-H-I-J represents displacement of variable displacement hydrostatic pump-motor 20 moving from a negative displacement with the first range planetary gear group 98 engaged at F through a zero displacement at O to a positive displacement at G at which point the second range planetary gear pump 122 is engaged, displacement of variable displacement hydrostatic pump-motor 20 is decreased from a maximum positive condition to a maximum negative condition represented by point H, when the third planetary gear group is engaged. In the third range, displacement of the variable displacement hydrostatic pump-motor 20 is increased from a maximum negative displacement to a maximum positive displacement at point I when the fourth range drive engagement means 134 is actuated. Disengagement of the lower range occurs immediately following an engagement or upshift to the next higher range. Displacement of the variable displacement hydrostatic pump-motor 20 is then decreased from a maximum positive displacement to a zero displacement at point J when clutch 80 is disengaged, brake 136 is locked (see FIG. 4) and a pure mechanical "locked-up" drive condition prevails beyond point J with engine speed increasing proportional with output shaft speed. Variable displacement hyrostatic pump-motor 20, being driven directly by engine 14 through transfer gears 16, is unidirectional and operates at a speed proportioned to engine speed up to point X. Fixed displacement hydrostatic pump-motor 18 is bi-directional and varies in speed depending on the displacement of variable displacement hydrostatic pump-motor 20.

Engagement of the first range planetary gear group occurs at a zero vehicle speed represented by point O (FIG. 12). The control system, to be discussed later, insures that variable displacement hydrostatic pump-motor 20 is at a zero displacement condition before engagement of the first range drive engagement means 104 (FIG. 4). With variable displacement hydrostatic pump-motor 20 at a zero displacement, fixed displacement hydrostatic pump-motor 18 will be stopped, thus first range planetary group 98 will similarly be stopped and engagement of drive engagement means 104 may be accomplished. In the first range forward, displacement of variable displacement hydrostatic pump-motor 20 is increased in the positive direction from point O to point G resulting in the relative speed of fixed displacement hydrostatic pump-motor 18 increasing from a zero speed condition at O to a maximum speed condition at point K. During this first range forward condition, all torque delivered to output shaft 28 is transmitted via the hydrostatic path between variable displacement hydrostatic pump-motor 20 and fixed displacement hydrostatic pump-motor 18 through the above described gear path. Simultaneously fixed displacement hydrostatic pump-motor 18 going from a zero speed condition to a relative speed condition indicated at point K, increases the speed of coaxial shaft 91 (FIG. 4) from a zero speed condition which in turn decreases the speed of planet gears 112 in recycling planetary group 108, while increasing the speed of sun gear 120, the input member of second planetary gear group 122, such that the rotation member, ring gear 126 of second planetary gear group 122, reaches a zero speed condition at point A (FIG. 12), the intermediate member of the second range planet group increases from point O to point A denoted by the solid line.

Simultaneously, the third range intermediate member is increasing in speed from point M to point K, while the fourth range intermediate member is decreasing in speed from point N to point K.

With the second range intermediate member at a synchronous speed with the first range intermediate member (denoted at point A in FIG. 12) the second range drive engagement means 128 may be actuated thereby insuring ring gear 126, the reaction member of second planetary group 122, remains stopped during the second range forward condition. The control system (to be described later) will insure that first range drive engagement means 104 remains engaged until the second range drive engagement means 128 is fully engaged. Output speed may be increased from point A to point B by decreasing displacement of variable displacement hydrostatic pump-motor 20 as indicated by broken line G-P-H. While displacement is decreased from point G to point H, variable displacement hydrostatic pump-motor 20 will act as a motor, driven by fixed displacement hydrostatic pump-motor 18. The fixed displacement hydrostatic pump-motor 18, acting as a pump, is driven through the recycling planetary group 108 by sun gear 106, while mechanical power is transmitted through the recycling planetary gear group 108 by carrier 110, planet gears 112 intermeshing with planet gears 114, sun gear 116, shaft 118, sun gear 120 to second range planetary group 122, as described above. Fixed displacement hydrostatic pump-motor 18 now acting as a pump drives variable displacement hydrostatic pump-motor 20 which adds torque to carrier 110 by shaft 81, clutch 80, gear 83 to spur gear 84 (a member of cluster gear 78) to spur gear 87 mounted on shaft 86. As displacement of variable displacement hydrostatic pump-motor 20 is decreased from point G to point P (FIG. 12) the speed of fixed displacement hydrostatic pump-motor 18 increases from point K toward point P. At point P the roles of variable displacement hydrostatic pump-motor 20 and fixed displacement hydrostatic pump-motor 18 are reversed with variable displacement hydrostatic pump-motor 20 becoming the pump while displacement is increased toward the maximum negative condition denoted at point H, power being transmitted from fixed displacement hydrostatic pump-motor through sun gear 106 to recycling planetary group 108.

During an increase in output speed while in the second range forward, the third range intermediate member decreases in speed from point K to point B (FIG. 12) as denoted by the broken line interrupted by three dots. It will be seen that at point B the third range intermediate member is operating at a synchronous speed with the second range intermediate member. Thus, drive engagement means 132 may be engaged, again the control system insuring that second drive engagement means 128 remains engaged until drive engagement means 132 is fully engaged and a power path is established through the recycling planetary group 108 to primary carrier 102. It should be noted that fixed displacement hydrostatic pump-motor 18 has reversed direction at point P and is operating at a maximum speed again at point Q but in the opposite direction.

With the third range drive engagement means 132 engaged, displacement of the variable displacement hydrostatic pump-motor 20 may be decreased from a maximum negative condition denoted at point H to a zero condition denoted at point S. Again, the roles of the variable displacement hydrostatic pump-motor 20 and the fixed displacement hydrostatic pump-motor 18 are reversed at point H, with the variable displacement hydrostatic pump-motor 20 acting as a motor driving through carrier 110, and the fixed displacement hydrostatic pump-motor 18 being driven through sun gear 106. The speed of the intermediate member of the third range forward increases from point B toward point C, while the speed of the fourth range intermediate member decreases from point Z toward point C, denoted by the dashed line interrupted by four dots. The roles of the variable displacement hydrostatic pump-motor 20 and the fixed displacement hydrostatic pump-motor 18 are again reversed at point S, with the variable displacement hydrostatic pump-motor again becoming a pump driving the fixed displacement hydrostatic pump-motor 18. The speed of the fourth range intermediate member will continue to decrease until a synchronous speed with the third range intermediate member is achieved. When the synchronous speed C is reached, fourth range drive engagement means 134 may be actuated, thereby driving primary carrier 102 by shaft 118. Again, the control system will insure that the third drive engagement means 132 remains engaged until the fourth drive engagement means 134 is fully engaged.

In the fourth range forward, variable displacement hydrostatic pump-motor 20 acts as a motor as the displacement is decreased from a maximum positive displacement denoted at point I toward a zero displacement condition at point J. The intermediate member of the fourth range forward will increase in speed from point C toward point D as displacement of the variable displacement hydrostatic pump motor 20 is decreased. At point J, with the variable displacement hydrostatic pump-motor at zero displacement, clutch 80 is disengaged, while brake 136 on shaft 91 is actuated. It should be understood that the speed of fixed displacement hydrostatic pump-motor 18 has decreased from a maximum at point C to a zero speed condition at point J. Output speed of shaft 28 may now be driven by a direct mechanical link through recycling planetary group 108 with the reaction member, sun gear 106, locked by brake 136. By locking out the hydrostatic path in this higher ranger, all engine horsepower is delivered to the mechanical power path.

Figure 5:
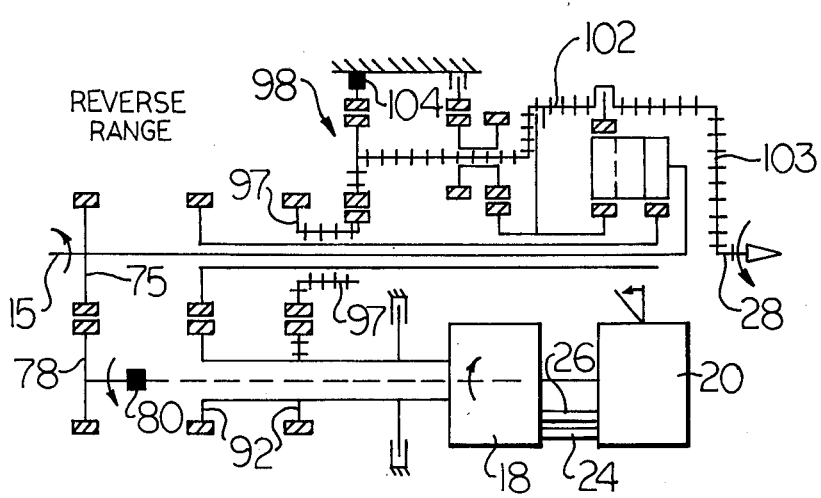
FIGS. 5 through 10 illustrate the power paths through the transmission in the various ranges.
Figure 6:
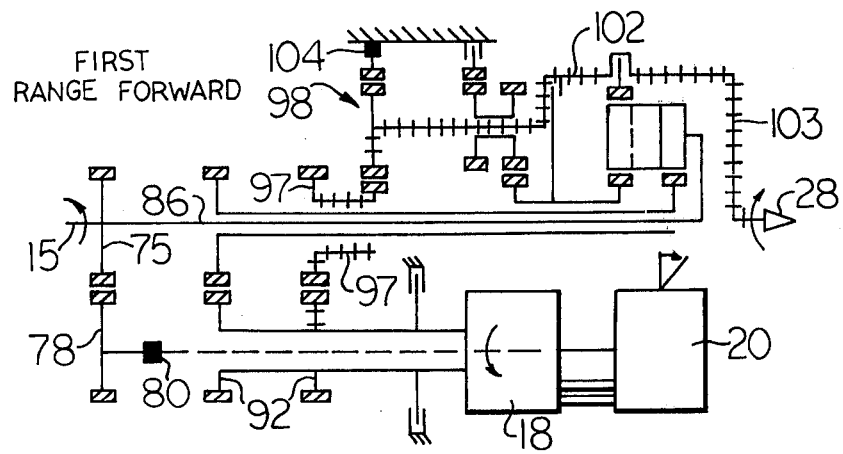

Diagrammatic sketches of the power flow through the transmission are illustrated in FIG. 5 through FIG. 10. Referring to FIG. 5, input shaft 15 drives variable displacement hydrostatic pump-motor 20 in the reverse range with clutch 80 engaged. Variable displacement hydrostatic pump-motor 20 drives fixed displacement hydrostatic pump-motor 18 through conduits 26 and 24 as displacement of variable displacement hydrostatic pump-motor 20 is varied from zero to a maximum negative displacement. With drive engagement means 104 engaged, fixed displacement hydrostatic pump-motor 18 drives through gear, 92, spur gears 97 first planetary gear group 98 to primary carrier 102, flange 103 and output shaft 28. Displacement of variable displacement hydrostatic pump-motor 20 from a zero displacement toward a maximum positive displacement as indicated in FIG. 6, reverses rotation of fixed displacement hydrostatic pump-motor 18 to provide a low range forward with drive engagement device 104 engaged. The hydrostatic drive path is shown in FIGS. 5 and 6 by the hatched line emanating from gear 92.

Figure 7:
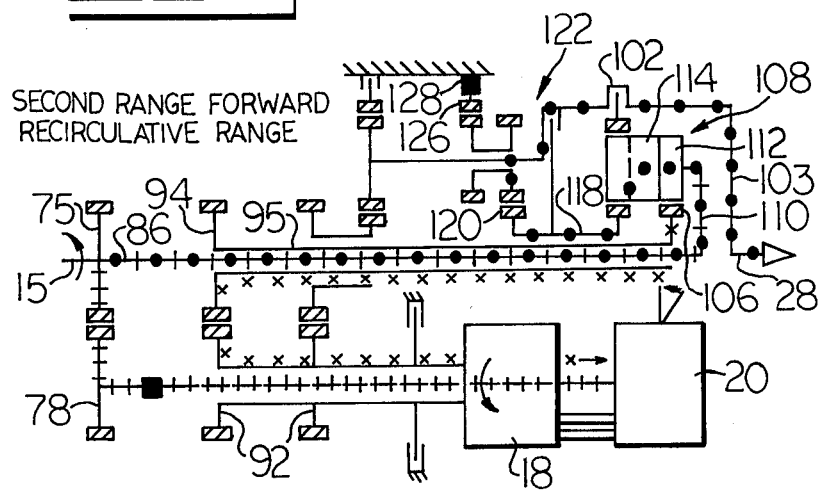
Figure 7A:
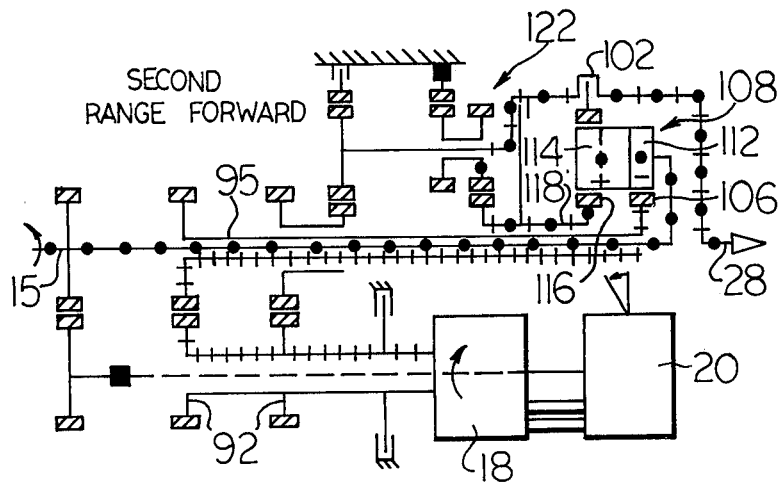

At the synchronous shift point A denoted in FIG. 12, drive engagement device 128 may be actuated and the power path follows that depicted in FIG. 7. Variable displacement hydrostatic pump-motor 20 acts as a motor, displacement being varied from a maximum positive condition toward a zero displacement. Fixed displacement hydrostatic pump-motor 18 is acting as a pump, being driven through sun gear 106, shaft 95, spur gear 94 and gear 92 and shown as an X'd line. Variable displacement hydrostatic pump-motor 20 acting as a motor drives spur gear 78, spur gear 75 and shaft 86, shaft 86 driving carrier 110 of recycling planetary unit 108, shown as a hatched line. A mechanical path shown as a dotted line from input shaft 15 is provided through planetary carrier 110 of recycling planetary unit 108, planet gears 112 intermeshing with planet gears 114 to shaft 118, sun gear 120 of second range planetary group 128. The reaction element ring gear 126 being locked by second drive engagement means 128, provides output to primary carrier 102, flange 103 and output shaft 28. Displacement of variable displacement hydrostatic pump-motor 20 from the zero displacement toward a maximum negative displacement is illustrated in FIG. 7A wherein variable displacement hydrostatic pump-motor 20 acts as a pump, and fixed displacement hydrostatic pump-motor 18 acts as a motor, driving through gear 92 to shaft 95, sun gear 106 of recycling planetary group 108, planets 112 intermeshing with planet gears 114 driving shaft 118 via sun gear 116 to second range planetary group 122. The output of second range planet group 122 being delivered to primary carrier 102 and output shaft 28. The mechanical path described in the second range forward depicted in FIG. 7 remains the same.

Figure 8:
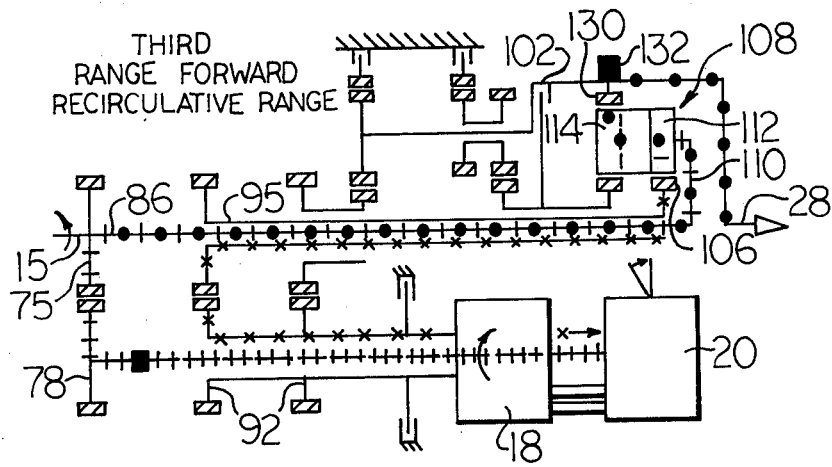
Figure 8A:
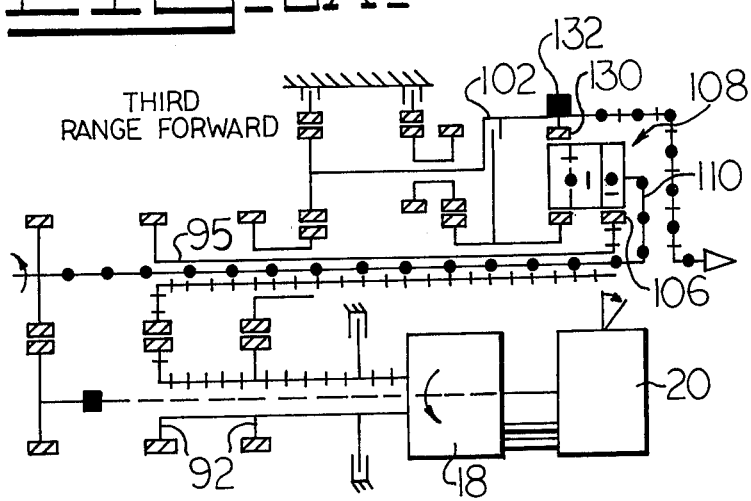
Figure 9:
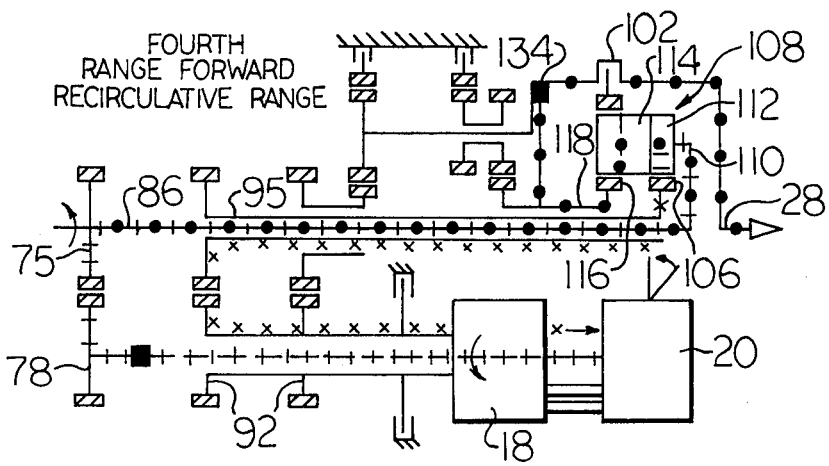

Upon attainment of synchronous shift point B as depicted in FIG. 12, engagement of third range drive engagement means 132 may be accomplished as illustrated in FIG. 8. Displacement of the variable displacement hydrostatic pump-motor 20 acting as a motor driven hydraulically by fixed displacement hydrostatic pump-motor 18. Fixed displacement hydrostatic pump-motor is driven by sun gear 106, shaft 95 and gear 92 represented by the X'd line. Variable displacement hydrostatic pump-motor 20 drives gear 78, gear 75 and shaft 86, shaft 86 driving recycling planetary carrier 110 of recycling planetary unit 108. Planet gears 112 intermeshing with planet gears 114 drive locked ring gear 130 which in turn drives primary carrier 102 providing power to output shaft 28. Displacement of variable displacement hydrostatic pump-motor 20 from a negative displacement condition toward a maximum positive displacement as indicated in FIG. 8A and with drive engagement means 132 engaged, results in variable displacement hydrostatic pump-motor 20 acting as a pump driving fixed displacement hydrostatic pump-motor 18 in the opposite direction. Fixed displacement hydrostatic pump-motor 18 drives through gear 92, shaft 95 to sun gear 106, combining with mechanical input provided at carrier 110 to recycling planetary unit 108. Output from recycling planetary unit 108 is through locked ring gear 130 to primary carrier 102.

At synchronous shift point C in FIG. 12, drive engagement means 134 for a fourth forward range may be actuated. Variable displacement pump-motor 20 is varied from a maximum positive displacement toward a zero displacement acting as a motor and receiving power from fixed displacement hydrostatic pump-motor 18 acting as a pump. Output from variable displacement hydrostatic pump-motor 20 is as described in FIG. 8 that is through spur gear 78, spur gear 75, shaft 86 to recycling planetary carrier 110 of recycling planetary unit 108, driving planet gears 112, sun gear 106, shaft 95, gear 92 thus providing a torque input to fixed displacement hydrostatic pump-motor 18. Power from recycling planetary unit 108 is through planet gears 114 to spur gear 116, shaft 118 and by means of fourth range drive engagement means 134 to primary carrier 102 and then to output shaft 28.

Figure 10:
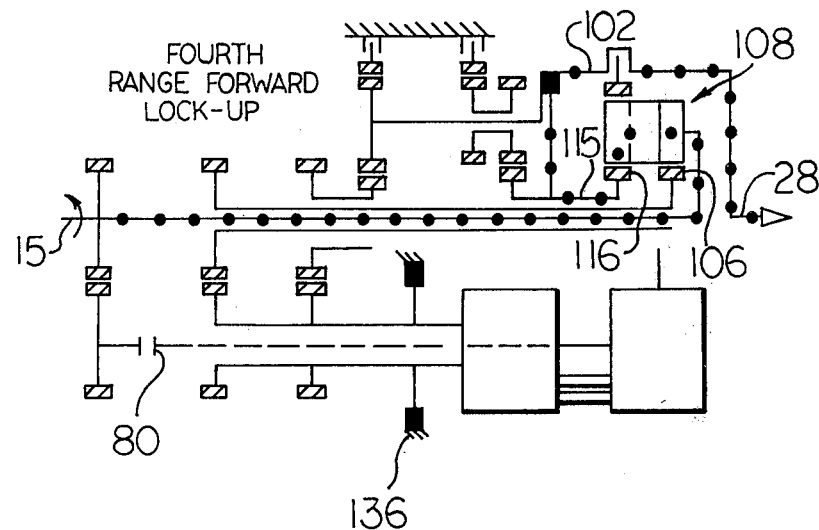

A fourth range lock-up is provided by disengagement of clutch 80 and engagement of brake 136 when variable displacement hydrostatic pump-motor 20 reaches zero displacement as depicted in FIG. 10. By locking brake 136, sun gear 106 of recycling planetary unit 108 becomes a reaction member, thus sun gear 116 drives shaft 118 which is mechanically engaged with primary carrier 102 and output shaft 28. In this fourth range forward lock-up condition, engine speed delivered to engine shaft 15 must be increased to increase the speed of output shaft 28.

Figure 11:
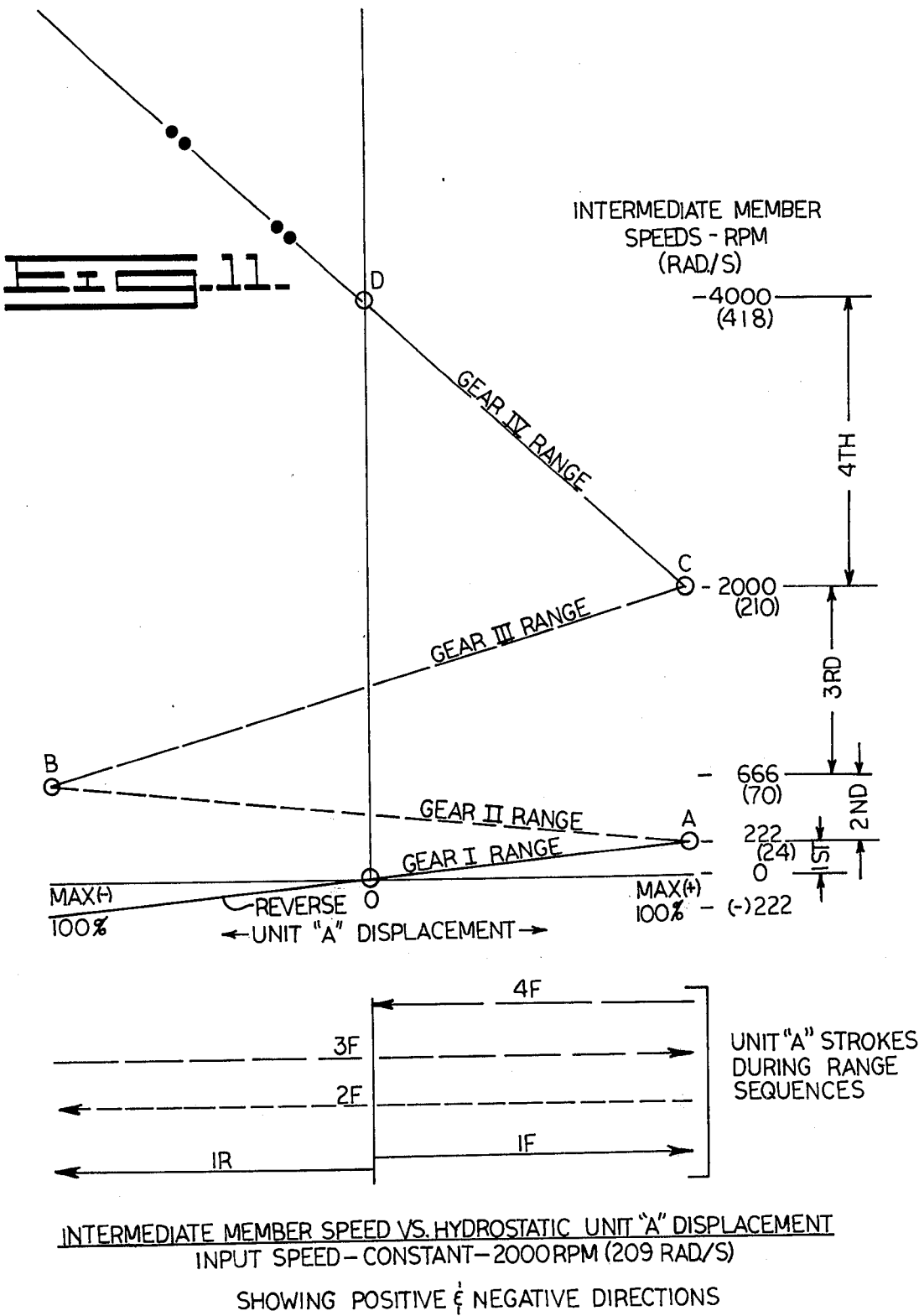
FIG. 11 is a graph of the speeds of the various intermediate members of the transmission illustrated in FIGS. 5 through 10 and a graphical depiction of the displacement of the variable displacement hydrostatic unit.

FIG. 11 illustrates the intermediate member speeds in revolutions per minute and radians per second, representative of the preferred embodiment. It is to be understood that the specific speeds set forth in FIG. 11 are in no way limiting to this invention, but may be representative of the invention.

CONTROL SYSTEM

THe control system for the above described transmission is depicted schematically in FIGS. 16 and 17. Fluid pressure is supplied to the control system from an engine drive pump 32 (FIG. 16) to conduit 34 through a filter 36 to a venturi and flow divider group 38. Venturi and flow divider group 38 performs two functions. Replenishing fluid is supplied to the hydraulic drive loop of the hydrostatic drive section comprised of variable displacement hydrostatic pump-motor 20 and fixed displacement hydrostatic pump-motor 18 through conduit 42 while an equal amount of fluid is supplied to the control system through conduit 40. The second purpose of venturi and flow divider group 38 is to provide a practical means to determine engine speed through differential pressure in a venturi, such differential pressure being supplied to pump actuator group 50 (FIG. 17) through conduits 138 and 139.

Referring to FIG. 18, venturi and flow divider group 38 is shown in detail. Incoming fluid is supplied through conduit 140 to venturi chamber 142 passing through venturi throat 144. Conduit 138 taps fluid pressure in venturi chamber 142 while conduit 139 taps fluid pressure at throat 144, thus conduit 138 will carry a higher pressure than conduit 139. Since engine speed is approximately proportional to the square root of the pressure differential across of the venturi, an approximate engine speed may be determined from this differential pressure.

Fluid leaves throat 144 passing to chamber 152 in housing 150 where floating spool 146 insures that fluid passing into chamber 152 is equally divided to conduits 42 and 40 notwithstanding downstream pressure. For example, if 21 GPM ($1.32 \times 10^{-3}$ m³/sec.) enters chamber 152, 10.5 GPM ($6.6 \times 10^{-4}$ m³/sec.) will be delivered to conduit 42 and a similar amount will be delivered to conduit 40. Utilization of a flow divider group as illustrated in more economical and practical than utilizing separate supply range.

Referring again to FIG. 16, fluid delivered to conduit 40 is transmitted to variable relief valve 44 (FIG. 17) in which supply pressure in conduit 40 may be decreased with certain clutches engaged. Variable relief valve 44 (illustrated in detail in FIG. 19) receives a signal through conduit 154 when first drive engagement means 104 is engaged, and receives signals through conduits 156 and 158 when the third and fourth drive engagement means are engaged respectively. A pressure signal received through conduit 154 acts on valve member 160 to augment resilient member 162 urging valve element 164 rightwardly. Fluid pressure in conduit 40 admitted to chamber 166 passes through orifice 168 into chamber 170 to act against valve element 164. Valve element 164 is opened by moving leftwardly allowing fluid pressure in chamber 170 to drain through passage 172 and conduit 174 to a heat exchanger associated with a reservoir (not illustrated). Resilient means 176 in chamber 170 urges spool member 178 downwardly, the force of resilient means 176 being greater than that required to displace valve element 164 leftwardly with pressure applied to the left end of valve member 160 through conduit 154. Thus, if pressure in chamber 166 and chamber 170 increases to the extent that relief by valve element 164 is insufficient, further relief is provided by passages 180 in spool member 178 opening to conduit 174. By applying pressure to valve member 160 through conduit 158 or conduit 156, valve element 164 is urged rightwardly only by the force created by resilient member 162. With pressure applied through conduit 158 or 156 a lower pressure may be applied to outgoing conduits 46 and 48 than would be supplied to conduit 46 and 48 if pressure is applied to valve member 160 by conduit 154. In a transmission of the type described herein, conduit 48, with the first range drive engagement means 104 engaged, will deliver 600 psi (4.1 MPa) and with the third range drive engagement means 132 engaged will deliver 300 psi (2.1 MPa). A similar pressure of 300 psi (2.1 MPa) is provided in conduit 48 when the fourth range drive engagement means 134 is engaged. The system pressure in the hydrostatic loop between fixed displacement hydrostatic pump-motor 18 and variable displacement hydrostatic pump-motor 20 is also delivered to variable relief valve 44 by means of conduit 182, branch conduit 184 to chamber 186. Such hydrostatic loop pressure delivered to conduit 186 acts on slug 188 to urge valve member 160 rightwardly. Such hydrostatic loop pressure applied in chamber 186 insure that downstream pressure in conduits 46 and 48 is greater when first range drive engagement means 104 is engaged and when second range drive engagement means 128 is engaged and hydrostatic loop pressure exceeds a given level. Use of variable relief valve 44 permits use of smaller first and second range clutches than would be possible if the supply pressure were constant to all four clutch engaging devices.

Fluid pressure delivered to conduit 46 from variable relief valve 44 (FIG. 17) passes to pump actuator group 50. Pump actuator group 50 (FIG. 20) is comprised of seven major valve elements, reducing valve 190, creeper valve 192, variable underspeed valve 194, pressure compensator valve 196, actuator stroke sequence valve 198, actuator supply override valve 200 and shift signal conditioner valve 202. As noted above in the discussion of variable valve 44, pressure in conduit 46 may vary. However, pressure in the pump actuator group 50 shoud remain at a pressure sufficient to actuate the displacement element of variable displacement hydrostatic pump-motor 20. In the particular application illustrated, the operating pressure to actuate variable displacement hydrostatic pump-motor 20 is 300 psi (2.1 MPa). In order to maintain a constant pressure in pump actuator group 50, fluid pressure is supplied to reducing valve 190 at annulus 204 where it is metered to passage 206 around metering edge 208 of spool member 210. Fluid metered around metering edge 208 is introduced to chamber 212 via passage 214 in spool member 210. Such fluid in chamber 212 acts against slug 216 to urge spool member 210 rightwardly against resilient means 217 thereby providing the necessary relief at metering edge 208.

Fluid pressure in passage 206 passes to annulus 218 to creeper valve 192. Creeper valve 192 allows the operator to control the maximum displacement of the variable displacement hydrostatic pump-motor 20 while operating in the first range forward and in the reverse range. Operation of creeper valve 192 will be discussed subsequently. Fluid pressure admitted at annular 218 of creeper valve 192 is communicated through port 220 of outer sleeve member 222 to groove 223 in spool member 224, thence through radial passage 225 to axial passage 226. From axial passage 226, fluid pressure is communicated through radial ports 227, groove 228, port 229 and thence to passage 230.

From passage 230, fluid is communicated to variable underspeed valve 194 which serves as an analog device to match actual engine speed to a command or desired engine speed. Referring to FIG. 21, variable underspeed valve 194 is shown in the operating position when engine speed equals command speed. Fluid pressure is communicated to variable underspeed valve 194 from venturi and flow divider group 38 through conduit 138 and conduit 139, conduit 138 supplying the higher upstream pressure, and conduit 139 supplying pressure at the throat of venturi throat 144. A spool member 232 is urged leftwardly in a bore 234 by resilient means 236. Resilient means 236 engages a plunger 237 which may be urged leftwardly by cam 238 thereby increasing the force acting on spool member 232. Referring to FIG. 20 it will be seen that cam 238 is positionable through linkage 70 in linkage 68. Linkage 70 and linkage 68 are controlled by the operator through foot pedal 66 (FIG. 1). Referring again to FIG. 21, fluid pressure from passage 230 is admitted to annulus 240 where depending upon the positioning of spool member 232 it is diverted to passages 244 or 245. When in the balanced position as shown in FIG. 21, the force in resilient means 236 comprises with the force due to pressure in chamber 241 and acts against force created by pressure admitted to chamber 242 communicated thereto by conduit 138. In this balanced condition, fluid pressure in passage 230 is blocked by land 243. It will be shown that positioning of the displacement element in variable displacement hydrostatic pump-motor 20 is controlled by pressure contained in either conduit 244 or conduit 245. In the balanced condition shown in FIG. 21 the displacement element in variable displacement hydrostatic pump-motor 20 remains stationary. A change in actual engine speed or a change in command or desired speed through rotation of cam 238 will cause a change in differential pressure between chamber 242 and chamber 241 as shown in FIG. 22. In FIG. 22 engine speed has exceeded speed commanded through cam 238 thus pressure in chamber 242 is increased by the commensurate higher pressure in conduit 138. Accordingly, spool member 232 is shifted rightwardly opening annulus 240 to groove 246 and admitting fluid pressure to passage 244 resulting in an upshift by a change of displacement in variable displacement hydrostatic pump-motor 20 and if necessary a selection of a higher gear range. Referring to FIG. 23 spool member 232 has been urged leftwardly by an engine speed less than command speed resulting in a lesser differential pressure between chamber 241 and chamber 242. Leftward movement of spool member 232 opens annulus 240 to groove 247 to communicate fluid pressure to passage 245 commanding a downshift to variable displacement hydrostatic pump-motor 20 and if necessary selection of lower gear range.

Referring again to FIG. 20, it will be seen that pressure communicated to passage 244 or 245 is further communicated to pressure, compensator valve 196. Pressure compensator valve 196 functions to interrupt the stroking of a variable displacement hydrostatic pump-motor 20 whenever the maximum pressure in the hydrostatic system manifold loop reaches a certain value. This reference pressure in the transmission being described varies from zero to 5000 psi (0 to 34.5 MPa). Pressure compensator valve 196 is comprised of a spool member 249 urged leftwardly by resilient means 250. Resilient means 250 is influenced by position of cam 252 acting on plunger 254 against which resilient means 250 abuts. Fluid pressure in the hydrostatic manifold loop is communicated to pressure compensator valve 196 by conduit 182 and is admitted to chamber 255 to act on slug 256 during spool member 249 rightwardly against resilient means 250. When pressure in chamber 255 reaches a maximum value determined by the position of cam 252, spool member 249 is urged rightwardly connecting passages 244 and 245. Passage 244 is in communication with axial passage 257 in spool member 249 through radial passage 258. Axial passage 257 communicates with annulus 260 by radial passages 262. When spool member 249 is urged rightwardly, metering edge 264 of groove 265 is brought into communication with annulus 260, thereby providing communication between passages 244 and 245. Such communication between passages 244 and 245 results in slowing the movement of the displacement of variable displacement hydrostatic pump-motor 20 by venting through drain 488 of drain 490 as appropriate of variable underspeed valve 194 thus reducing acceleration or deceleration of the vehicle until pressure in the hydrostatic manifold decreases.

With spool member 249 in the position as shown in FIG. 20, fluid pressure in passage 244 or passage 245 is communicated to passage 267 or 268 by means of groove 266 or 265 respectively. Fluid pressure in passage 267 or 268 is further communicated to actuator stroke sequence valve 198 to direct fluid to the correct end of piston 361 (FIG. 24) in actuator group 54. Actuator stroke sequence valve comprises a spool member 270 urged leftwardly by a resilient means 272. Spool member 270 of actuator stroke sequence valve 198 is urged rightwardly when either the second range drive engagement means 128 or the fourth range drive engagement means 134 is engaged or a reverse signal is received at passage 274. Signals received in conduit 158 from fourth range drive engagement means 134 are transmitted through check valve 277 and check valve 278 to passage 274, similarly signals received through conduit 275 from clutch control group 52 are transmitted through check valve 278 to passage 274. While the first and third range drive engagement means are engaged, spool member 270 is in its leftward position as shown in FIG. 20. It will be seen that fluid pressure delivered to actuator stroke sequence valve 198 through passage 267 while in its leftward position as shown in FIG. 20, is further communicated to passage 280, and fluid pressure in passage 268 is communicated to passage 282. Urging of spool 270 to its rightward position reverses the above fluid flow resulting in fluid pressure in passage 267 being directed to passage 282 and fluid pressure in passage 268 being directed to passage 280. The purpose of reversal of the roles of passages 282 and 280 is to control the direction of the displacement element in the variable displacement hydrostatic pump motor 20. That is, the variable displacement hydrostatic pump-motor 20 is stroked in one direction while upshifting when either the first range or third range drive engagement means is engaged and in the opposite direction while either the second or fourth range drive engagement means is engaged.

Fluid pressure in passages 282 and 280 is delivered to actuator supply override valve 200 (FIG. 20) at grooves 283 and 284. Actuator supply override valve 200 insures that the displacement of the variable displacement hydrostatic pump-motor 20 is in a null or zero displacement position after the engine is started up and before the operator can place the transmission control system in a drive mode. A start signal is received at passages 286 (the start signal will become more apparent upon discussion of the clutch control group 52). Start signal at passage 286 urges spool member 288 rightwardly against resilient means 290 to the position shown in FIG. 20 thereby blocking communication of fluid pressure in passages 280 and 282. Concurrently fluid pressure in passage 292 is vented to passage 296 by groove 295, and fluid pressure in passage 294 is vented to passage 296 by means of orifice 298 orifice 297 and axial passage 299 in spool member 288. Relief of start signal pressure in passage 286 allows resilient means 290 to urge spool 288 to its leftward position thereby communicating fluid pressure in passage 282 to passage 292 by groove 293 while communicating fluid pressure in passage 280 to passage 294 by groove 284. Fluid pressure in passage 292 and 294 is further communicated to actuator group 54 (FIG. 16) controlling the displacement of variable displacement hydrostatic unit 20.

Shift signal conditioner valve 202 (FIG. 20) receives a hydraulic signal from a pressure signal valve 301 shown in FIG. 24 indicating the variable displacement hydrostatic pump-motor displacement element is either at a maximum positive or a maximum negative displacement and on receipt of such signal indicates a shift in the range drive engagement means. In the particular transmission being described the displacement element comprises a swash plate in an axial type variable displacement hydrostatic unit, however a radial type hydrostatic unit would be equally applicable. Pressure signal valve 301 receives pressure from venturi and flow divider group through conduit 42 (see FIG. 16) which feeds the hydrostatic manifold pressure loop through a replenishment circuit (not shown).

Referring to FIG. 24, pressure supplied by conduit 42 passes through orifice 303 to conduit 304 to chamber 305 of pressure signal valve 301. Pressure signal valve 301 will open to drain 306 at a minimum pressure when the displacement element of variable displacement hydrostatic pump-motor 20 is at less than a maximum positive or negative displacement. Follower 307 which tracks displacement of variable displacement hydrostatic pump-motor 20 will contact load piston 308 at either maximum positive displacement or maximum negative displacement by edge 309 or 310 contacting projection 311. When so contacted, load piston 308 will close drain 306 by acting on poppet valve 312 thereby increasing pressure in chamber 305 to that of conduit 42. Such pressure in chamber 305 is transmitted by conduit 314 to shift signal conditioner valve 202 as shown in FIG. 20, while fluid pressure in passage 245 commanding a downshift is transmitted to shift signal conditioner valve 202 by means of conduit 316 and delivered to chamber 317. Similarly, pressure in passage 244 commanding an upshift is transmitted to shift signal conditioner valve 202 by conduit 318 and thence to chamber 319. Pressure in chamber 319 will shift spool member 320 rightwardly communicating pressure in conduit 314 to passage 321 and thence to clutch control group 52. Similarly, pressure in chamber 317 communicating a downshift from passage 245 via conduit 316 will position spool member 320 leftwardly (as shown in FIG. 20) delivering fluid pressure in conduit 314 to passage 322 and thence to clutch control group 52. Fluid pressure in passage 321 commanding an upshift of the range gears, and fluid pressure in passage 322 commanding a downshift of the range gears.

Referring to FIG. 26, clutch control group 52 is shown partly in cross section and partly schematically. Clutch control group 52 is comprised of valve elements of which two are positioned by the operator through location of selector lever 58 (see FIG. 1). Clutch control group 52 (FIG. 26) insures the displacement element of the variable hydrostatic unit 20 is positioned in a null or zero displacement condition prior to engagement of clutches in the transmission at engine start-up, additionally, clutch control group 52 provides the operator a means for limiting the reduction ratio of the transmission. Clutch control group 52 automatically engages clutches in transmission 22 upon demand of variable underspeed valve 194 operating through shift signal conditioner valve 202 (see FIG. 20), while providing a logic capability to maintain in readiness the appropriate clutch selector valve on either side of the operating clutch, that is if the second range clutch has been engaged the memory logic circuit of clutch control group 52 maintains the first range clutch selector valve and the third range clutch selector valve in readiness for engagement in the event of an upshift or downshift signal from shift signal conditioner valve 202.

Clutch control group 52 is comprised of mode selector valve 324 which, as noted above, is controlled by the operator through selector lever 58. Four clutch selector valves, first range clutch selector valve 326, second range clutch selector valve 328, third range clutch selector valve 330 and fourth range clutch selector valve 332 respectively provide hydraulic pressure to the appropriate drive engagement means. Five logic valves, first logic valve 334, second logic valve 336, third logic valve 338, fourth logic valve 340 and fifth logic valve 342 provide the function of insuring the incoming clutch pressure is directed to the appropriate clutch selector valve. Signals to the five logic valves are received through first shift cutoff valve 344 or second shift cutoff valve 346, while pressure is communicated to the five logic valves from the actuated drive engagement means through conduit 154 for the first range, conduit 275 for the second range, conduit 156 for the third range, and conduit 158 for the fourth range. Range limiter valve 348 performs the function described above in limiting the maximum reduction ratio of the transmission and is controlled by the operator through selector lever 58. Range limiter valve 348 is a five position valve in the particular transmission herein described having a reverse position, a first range forward, a second range forward, a third range forward, and a fourth range forward position.

Supply pressure is communicated to clutch control group 52 through conduit 48 from variable relief valve 44. It is to be remembered that supply pressure in conduit 48 will vary according to the actuated drive engaging means as controlled by variable relief valve 44. In the start mode, as shown in FIG. 26, supply pressure in conduit 48 is communicated to mode selector valve 324 at groove 350. Fluid pressure supplied to groove 350 is communicated through axial passage 352 of spool member 354 to groove 356 where it is communicated to conduit 358. Fluid pressure in conduit 358 is communicated to pump actuator group 50 to position actuator supply override valve 200 in the start position as described above (see FIG. 20) and is simultaneously communicated to actuator group 54 (see FIG. 25). Referring to FIG. 25, which is a sectional view taken at XXV—XXV of FIG. 24, a pair of slide valves 358 and 359 are utilized to lock follower 307 in the center or null position. Follower 307 is linked with piston 361 by means of link 362 (see FIG. 24), piston 361 controlling the displacement of variable displacement hydrostatic pump-motor 20. Hydraulic pressure in conduit 358 acts on check valve 363 and check valve 364 to pressurize chamber 366 and chamber 367 and urge spool member 368 of slide valve 358 and spool member 369 of slide valve 359 downwardly. Referring to FIG. 24, follower 307 defines a longitudinal slot 370 having a widened center portion 371. Referring again to FIG. 25, spool 368, and spool 369 define neck portions 373 and 374 respectively, neck portions 373 and 374 allowing rightward and leftward movement of the narrower portions of slot 370 while the wider portions of slide valves 358 and 359 may be received in the widened center portion 371 of slot 370. Thus, with follower 307 off center as illustrated in FIG. 24 and shown in cross-section off center in FIG. 25, fluid pressure in conduit 358 introduced to chamber 366 is communicated to conduit 294 by axial passage 375. Referring to FIG. 24, fluid pressure in conduit 294 is introduced into chamber 376 to urge piston 361 leftwardly causing follower plate 307 to be urged leftwardly until such time that the wider portion of spool 368 may be received in widened center portion 371 of follower 307. Simultaneously fluid pressure in conduit 358 is admitted to chamber 367, with follower 307 positioned as shown in FIG. 24, spool 369 is urged downwardly, the wider portion of spool 369 passing into widened center portion 371 of slot 370. With spool 369 in its downward position as illustrated in FIG. 25 fluid pressure in chamber 367 is communicated by axial passage 377 to passage 379. As follower plate 307 reaches its center position and spool 368 is urged downwardly as described above, groove 380 opens passage 379 to passage 381 and conduit 382. Referring back to FIG. 26 fluid pressure in conduit 382 is communicated to groove 383 to urge spring loaded lock 384 leftwardly, thereby permitting the operator to position mode selector valve 324 in the drive position. A thorough discussion of the structure of clutch control group 52 will be undertaken in discussion of the operation of the transmission wherein the structure and function of each valve will be discussed.

As pointed out in the discussion of the transmission above, variable displacement hydrostatic pump-motor 20 is disengaged in the higher range of fourth range forward. Lock up and clutch control group 56 as illustrated in FIG. 32 accomplishes this purpose. Clutch 80 normally engaged by spring force, which engages variable displacement hydrostatic pump-motor 20 with the drive train is hydraulically disengaged, while brake 136 normally disengaged by spring force, which stops rotation of fixed displacement hydrostatic pump-motor 18 is hydraulically engaged. The process of disengaging clutch 80 and engaging brake 136 occurs when variable displacement hydrostatic pump-motor 20 is at zero displacement. Accordingly, poppet valve 386, shown in FIG. 24 is provided to signal the zero displacement of variable displacement hydrostatic pump-motor 20. Furthermore, displacement of variable displacement hydrostatic pump-motor 20 even though disengaged must be avoided in the high range while the fourth range forward is engaged. In order to accomplish this function pressure in conduit 158 from the fourth range drive engagement means 134 is introduced to chamber 388 in slide valve 359 (see FIG. 25) urging spool 369 upwardly against spring bias 389 and allowing neck 390 to be received in the widened center portion 371 of slot 370 (see FIG. 24). Fluid pressure in conduit 158 is further passed through an orifice 390 following which the flow is divided to conduit 392 and conduit 394. Fluid pressure in conduit 394 with fourth range drive engagement means 134 actuated is introduced to poppet valve 386 (FIG. 24) wherein such pressure is relieved to drain 396 unless follower 307 has urged load piston 398 downwardly by ramp 399 contacting load piston 398 and signalling the centering of follower 307. With load piston 398 depressed and signalling a center or null position of follower 307 pressure in conduit 394 is built up simultaneously increasing pressure in conduit 392 (FIG. 25). Pressure in conduit 392 is communicated to lock up clutch control group 56 to urge spool 400 rightwardly allowing fluid pressure from supply conduit 48 to pass around spool 400 to conduits 401 and 402, conduit 401 to disengage clutch 80, and conduit 402 to engage brake 136. Variable displacement hydrostatic pump-motor 20 is thus disengaged in the high range of fourth range forward to eliminate an unnecessary and uneconomical drive. By locking fixed displacement hydrostatic pump-motor 18, the reaction member of the fourth range planetary drive gear assembly is stopped thereby effecting drive to drive shaft 28 as described above.

OPERATION

Referring to FIG. 12, a graph is shown depicting the relative speed of intermediate planetary members as a function of displacement of variable displacement hydrostatic pump-motor 20. Dashed line FGHIJ depicts displacement of varible displacement hydrostatic pump motor from the first range reverse to the fourth range lock up position while solid line ROABCD indicates relative speed of output shaft 28 showing the shift points, A, B, and C wherein the second range, third range, and fourth range planetary units are engaged. Input shaft speed depicted by solid line EKCD across the top of the graph depicted in FIG. 12 is constant throughout to point X at which time output shaft 28 is driven directly by the engine. Solid line ROA represents the speed of the intermediate member of the first range planetary group, which is engaged with output shaft 28 between points R and A. At point A the second range planetary group is engaged. The speed of the third range intermediate member is depicted by the broken line illustrated by dashes interrupted by three dots, and the speed of the fourth range intermediate member by a broken line and four dots. It will be seen that the third range planetary group is engaged between point B and point C while the fourth range is engaged between point C and point D. Direction and relative speed of the fixed displacement hydrostatic motor 18 is depicted by line OKQCJ, the broken line being interrupted by small x's. It is to be noted that there is a reversal of direction of fixed displacement hydrostatic pump-motor 18 at point P and point S. At point J fixed displacement hydrostatic pump-motor 18 is locked by brake 136 (see FIG. 4) while variable displacement hydrostatic pump-motor 20 is disengaged from the input shaft by disengagement of clutch 80.

Referring to FIGS. 5 through 10, the power path through the transmission is depicted for the various ranges. Although described in detail in the discussion of the transmission, a summary of these figures is included here for clarity. In FIG. 5 the reverse range power path is shown by hatching, the power path being fully hydrostatic from fixed displacement hydrostatic pump-motor 18 through first planetary group 98 to output shaft 28. Referring again to FIG. 12, displacement of variable displacement hydrostatic pump-motor 20 is toward a negative direction. FIG. 6 depicts the power path in first range forward in which displacement of variable displacement hydrostatic pump-motor 20 increases from zero in a position direction toward point G (see FIG. 12) with fixed displacement hydrostatic pump-motor 18 rotating in the opposite direction. FIG. 7 indicates the power path in second range forward in the recirculative range. In this portion of the second range forward fixed displacement hydrostatic pump-motor 18 is actuating as a pump driven from recycling planetary group 108 and signified by the "x-ed" line. Mechanical power is provided to recycling planetary group 108 by the dotted line while hydrostatic power from variable displacement hydrostatic pump-motor 20 is signified by the hatched line. Recycling planetary group 108 drives second range planetary group 122 with second drive engagement means 128 engaged. In FIG. 7A the power path is depicted illustrating variable displacement hydrostatic pump-motor 20 acting as a pump, while fixed displacement hydrostatic pump-motor 18 is acting as a motor providing input to recycling planetary group 108. Similar power paths are shown in FIGS. 8, 8A, 9 and 10 for the third range forward and fourth range forward.

Referring to FIG. 11, specific speeds for intermediate members are depicted for a transmission built in accordance with this application wherein engine speed or input speed is a constant 2000 rpm (209 rad/s).

What is evident from FIG. 12 is that the intermediate member of two adjacent range groups rotate in a synchronous speed condition when an upshift or a downshift to the adjacent range gear is required, simultaneously direction of displacement of the variable displacement hydrostatic pump-motor 20 having reached a maximum condition must be reversed. It is the function of the control group during operation of this transmission to provide this capability with minimum operator intervention. In particular, the control group will control the displacement element of variable displacement hydrostatic pump-motor 20 while comparing actual engine speed with that commanded by the operator, and shifting the range clutches at the proper time and in the proper sequence in order to maintain uninterrupted output torque, all the while operating the engine at an optimum and efficient speed. An understanding of the importance of maintaining engine speed at an optimum level is obtained from FIG. 14. Assume that FIG. 14 represents horsepower curves of an engine to be used with the described transmission. Line A-B1-C represents "full governor" lug and overrun horsepower curve. The dotted lines DE, FG, HJ, and KL are part governor overrun curves. Now, suppose for optimum fuel consumption rates this engine should not be run at horsepower levels above the M–X for any of the multitude of possible part governor settings. Suppose further that points X, P, O and N represent the most ideal steady state horsepower operating points for the various part governor setting which are represented by part governor, no load points D, F, H and K. Now, for example, if for the part governor setting represented by horsepower curve AED one can automatically and continuously adjust the transmission and reduction ratio to apply that load to the engine which will permit it to run at or very near point X, the engine will operate at its most suitable power level (minimum fuel consumption) for that governor setting. Variable underspeed valve 194 in pump actuator 50 (see FIG. 20) performs this important function of controlling automatic adjustment of the transmission reduction ratio to allow the engine to run at that point.

The venturi differential pressure force (obtained from venturi and flow divider group 38 depicted in FIG. 18) indicating engine speed operates on spool 232 of variable underspeed valve 194 (see FIGS. 21-23). Such force is represented by the hopothetical curve shown in FIG. 13. The only other external force on spood 232 is that due to resilient means 236 which is regulated by rotation of cam 238, which is directly related to engine governor setting. The underspeed spool 232 will be in the balanced force condition indicated in FIG. 21 only if the spring force and the differential pressure force are equal. Therefore, if the cam profile is designed to induce a spring force of, for example, 39 lbs. (174.8N) at a governor setting represented by no load point F in FIG. 14 then the spool will maintain the balanced force position only if the representative engine runs at 1650 rpm (173 rad/s) (point P, FIG. 14 and point P2, FIG. 13). If the engine speed exceeds that value the underspeed spool 232 will move in the spring end direction (FIG. 22) pressurizing conduit 244 and causing the transmission to upshift by shifting the displacement element and/or engaging a higher range gear (reduces the reduction ratio) until the load on the engine is increased and lugs it down to 1650 rpm (173 rad/s). If the engine speed falls below 1650 rpm (173 rad/s), the underspeed valve will move leftwardly (FIG. 25) pressurizing conduit 245 which will cause the transmission to downshift allowing engine speed to return to that desired.

Having set forth principles behind this invention, reference is made to FIG. 26 for an understanding of the operation of the transmission. Operation of mode selector valve 324 in the start position has been discussed in part. While in the start position, mode selector valve 324 provides fluid pressure to start signal conduit 358 to force variable displacement hydrostatic pump-motor 20 to a zero displacement at the same time providing fluid pressure to actuator supply override valve 200 in pump actuator group 50. Simultaneously fluid pressure is provided to passage 404 to second shift cut off valve 346 at groove 405, to passage 406 thence to chamber 407 and 408 to urge logic valve 338 and logic valve 340 upwardly, simultaneously pressure is communicated from passage 406 to chamber 409 to urge logic valve 342 upwardly. While mode selector valve 324 is in a start position, fluid pressure in supply conduit 48 is also communicated to passage 410, thence groove 411 of logic valve 342, groove 412 of logic valve 340, groove 413 of logic valve 338 thence via passage 414 to first range clutch selector valve 326 at chamber 415 urging first range selector valve 326 upwardly in preparation for actuation of first range drive engagement means.

Referring now to FIG. 27, positioning of mode selector valve 324 in the drive position following the start up condition described in the preceding paragraph and with range limiter control valve 348 in one of the forward ranges, here depicted as third range forward, fluid pressure in groove 350 is communicated to passage 416 and groove 417 of first range selector valve 326 which has been displaced upwardly by pressure in chamber 415 in the start mode. Fluid pressure in groove 417 is transmitted to first range drive engagement means 104 via conduit 154. As pointed out above, fluid pressure in conduit 154 operates on variable relief valve 44 (FIG. 19) to insure a higher pressure at the first range clutch. Additionally, first range drive engagement means pressure is provided to valve 359 in actuator group 54 (see FIG. 25) to insure displacement of variable displacement hydrostatic pump-motor 20 will occur in the positive direction only. Such fluid pressure in conduit 154 supplied to valve 359 (FIG. 25) passes through a two position valve 492 operated by fluid pressure in conduit 276 to block fluid pressure in conduit 154 when the reverse range is selected, conduit 276 being pressurized when range limiter control valve 348 (FIG. 26) is placed in the reverse position. Check valve 364 (FIG. 25) insures that fluid pressure in conduit 154 is directed only to valve 359. Fluid pressure in conduit 154 also acts on slug 418 in logic valve 340 and slug 419 of logic valve 342 thereby fulfilling the function performed by pressure in conduit 406 in the start mode, that is of maintaining logic valve 342 and logic valve 340 in the upward position to allow fluid pressure in passage 410 to pass around logic valve 342, logic valve 340, and logic valve 338 to passage 414 thereby maintaining pressure in chamber 415.

Clutch control group 52 as depicted in FIG. 27 is in readiness for an upshift signal to be received through conduit 321 from shift signal conditioner valve 202 (FIG. 20). Such an upshift signal will occur when engine speed exceeds command speed shifting variable underspeed valve 194 rightwardly as depicted in FIG. 22 and piston 361 (FIG. 24) is at maximum displacement. Referring again to FIG. 27, an upshift signal in conduit 321 is communicated to groove 421 of first shift cut off valve 344, wherein it is further communicated to passages 423 and 425. Simultaneously, the upshift signal in conduit 321 is communicated to check valve 426 and through an orificed passage 427 to chamber 428, to urge first shift cut off valve 344 upwardly. However, before first shift cut off valve 344 has shifted upwardly sufficiently to cut off pressure to conduits 423 and 425 such pressure in conduit 423 has shifted third logic valve 338 downwardly by pressurizing chamber 430. Similarly, pressure in passage 425 has pressurized chamber 431, however through the operation of variable relief valve 44, fluid pressure in conduit 154 exceeds that in conduit 321 thereby maintaining fourth logic valve 340 in the upward position. Movement of third logic valve 338 downwardly diverts fluid pressure communicated to groove 413 from passage 414 which had actuated drive engagement means 104 to passage 433. Fluid pressure in passage 433 shifts logic valve 336 downwardly by pressurizing chamber 434, simultaneously fluid pressure in passage 433 is communicated to slug chamber 435 of second range clutch selector valve 328, urging second range clutch selector valve 328 downwardly to the position shown in FIG. 28.

Such downward movement of second range clutch selector valve 328 causes fluid pressure in passage 416 to be delivered to second drive engagement means 128 via conduit 275 by groove 436. Fluid pressure in groove 436 is further communicated to passage 437 and thence to spring and slug cavity 439 thus urging first range clutch selector valve 326 downwardly to vent pressure in conduit 154 to drain 440. Simultaneously pressure in passage 437 is communicated to groove 442 of second logic valve 336 where it is further communicated to passage 443 wherein a downshift condition, from third range to second range, would shift third range clutch selector valve 330 downwardly in the same manner that firt range clutch selector valve 326 was shifted downwardly in the upshift from first range to second range as described above. A downshift signal received through conduit 322 to second shift cut off valve 346 passes through check valve 445 to groove 405 of second shift cut off valve 346 and thence to passage 406 pressurizing chamber 408 of fourth logic valve 340, simultaneously chamber 407 of first logic valve 338 is pressurized moving valve 338 upwardly and repressurizing passage 414 communicating fluid pressure to chamber 415 in first range clutch selector valve 326 thereby repressurizing conduit 154 and actuating first range drive engagement means 104. Movement of third logic valve 338 upwardly opens passage 433 to drain 452 through groove 453 thereby venting slug chamber 435 and moving second range clutch selector valve 328 upwardly to vent conduit 275.

An upshift signal with second range drive engagement means actuated operates in a manner similar to that described above when an upshift signal is received in first range. Referring to FIG. 29, fluid pressure is communicated from conduit 321 through first shift cut off valve 344 to urge third logic valve 338 downwardly and urge fourth logic valve 340 downwardly. Fifth logic valve 342 remains in the upward position as a result of fluid pressure in conduit 275 acting against slug 419. Movement of fourth logic valve 340 downwardly communicates fluid pressure in groove 412 to passage 448 pressurizing chamber 450 of first logic valve 334 simultaneously pressurizing chamber 454 of third range clutch selector valve 330. Pressurization of chamber 454 urges third range clutch selector valve 330 upwardly opening conduit 156 by means of groove 449 to pressure in passage 416, pressure in conduit 156 pressurizing the third range drive engagement means 132. Release of the second range drive engagement means 128 is accomplished through movement of first logic valve 334 upwardly as described above providing pressure from groove 449 of third range clutch selector valve 330 to pressurize passage 456, such pressure in passage 456 passing through groove 458 to passage 446, in turn, pressurizing spring and slug cavity 447 thereby urging second range clutch selector valve 328 upwardly and venting conduit 275. It will be noted in FIG. 29 that range limiter control valve 348 becomes operational in the third range because of preselection of the operator. Such operation in the third range in FIG. 29 is illustrative of similar operation in the first, second, and fourth range which will not be separately described. Fluid pressure at groove 458 is communicated to axial passage 460 of range limiter control valve 348 by passage 462. Fluid pressure in axial passage 460 is communicated to chamber 428 of first shift cut off valve 344 by passage 461 and check valve 426. Pressure in chamber 428 urges first cut off valve 344 upwardly thereby closing any further upshift signal in conduit 321 from reaching groove 421. Thus it is seen that the operator has an option of cutting off a higher range selection by positioning the range limiter control valve 348.

Downshift in third range is accomplished in a manner similar to that described above for downshift from second range to first range with fluid pressure supplied via conduit 322 to second shift cut off valve 346. Fluid pressure supplied to second shift cut off valve 346 at groove 405 shifts fourth logic valve 340 upwardly thereby cutting off fluid pressure in passage 448 to chamber 454 of third range clutch selector valve 330. Third logic valve 338 is prevented from being shifted upwardly by third range clutch pressure in conduit 156 acting against slug 464 of third logic valve 338. With fourth logic valve 340 in the upward position fluid pressure communicated to groove 412 is further communicated to groove 413 in the second logic valve 338 thus pressurizing chamber 435 in second range clutch selector valve 328 by passage 433. Pressurization of passage 433 operates to urge second logic valve 336 downwardly thereby communicating fluid pressure in groove 436 through groove 442 by passage 437, and thence through passage 443 to slug cavity 466 urging third range clutch selector valve 330 downwardly and venting conduit 156.

With the third range clutch engaged and pressure in conduit 156, a shift of range limiter control valve 348 upwardly to the fourth range allows an upshift signal in conduit 321 to engage fourth range drive engagement means 134 and disengage third range drive engagement means 132 in a manner similar to that described above. Referring to FIG. 30, pressure in conduit 156, which has pressurized third range drive engagement means 132 is admitted to third logic valve 338 to act on slug 464 thereby preventing an upshift signal in conduit 321 acting through groove 421 and passage 423 to operate on second logic valve 338. However, the pressure in conduit 321 acting through passage 423 acts on fifth logic valve 342 at chamber 470 to move logic valve 324 downwardly thereby communicating supply pressure in passage 410 to passage 472 by means of groove 411. Pressure in passage 472 pressurizes chamber 474 in second logic valve 336 while simultaneously pressurizing chamber 476 of fourth range clutch selector valve 332 permitting fluid pressure in passage 416 to pass to conduit 158 by means of groove 478 and pressurize fourth range drive engagement means 134. Fluid pressure in groove 478 is communicated to passage 480, groove 442 of second logic valve 336 and thence to passage 443 to pressurize slug cavity 466 of third range clutch selector valve 330 urging it downwardly to vent pressure in conduit 156. A downshift signal received in conduit 322 acts in a manner similar to a downshift signal received in the lower range clutches as described above. The downshift signal urges fifth logic valve 342 upwardly to block fluid pressure in groove 411 from reaching passage 472 while simultaneously opening passage 472 to drain 482. The downshift signal in conduit 322 is further communicated to fourth logic valve 340 wherein upward movement is prevented by pressure in conduit 158 acting in chamber 468, thus fluid pressure in groove 411 is communicated to passage 448 by means of groove 412. Fluid pressure in passage 448 acts in turn to pressurize chamber 454 of third range clutch selector valve 330 urging it upwardly to pressurize conduit 156. Pressure in groove 449, received from passage 416 with third range clutch selector valve 330 urged upwardly, is communicated to passage 484 and further to slug cavity 486 of fourth range clutch selector valve 332 urging fourth range clutch selector valve 332 upwardly to disengage fourth range drive engagement means 134. As described above, fluid pressure in conduit 158 is communicated to actuator group 54 to prevent stroking of the variable displacement hydrostatic pump-motor 20 in the upper half of the fourth range. This function is accomplished by poppet valve 386 illustrated in FIG. 24.

Referring to FIG. 31, the range limiter control valve 348 has been positioned in the reverse position. With mode selector 324 in the drive position pressurization of first range drive engagement means 104 through conduit 154 is as described above. Fluid pressure in groove 417 of first range clutch selector valve 326 is communicated to passage 486 wherein it is further communicated to pressurize axial chamber 460 of range limiter control valve 348. Fluid pressure in axial chamber 460 is communicated by conduit 276 to reset slide valve 358 of actuator group 54 to prevent positive displacement of variable displacement hydrostatic pump-motor 20 while simultaneously correctly positioning actuator stroke sequence valve 198 of pump actuator group 50. Fluid pressure in conduit 276 also acts on spring loaded two position valve 492 to allow negative displacement of variable displacement hydrostatic pump-motor 20, such negative displacement being normally prevented when the first range drive engagement means 104 is actuated by pressure in conduit 154.

Operation limited to the first range forward and the reverse range by positioning control lever 58 (FIG. 17) allows the operator to control the maximum displacement of variable displacement hydrostatic pump-motor 20 through creeper control valve 192 (FIG. 32). Linkage 64 which is controlled by transverse movement of control lever 58 positions spool 224 of creeper control valve 192 while follower 486 which is linked to follower 307 (FIG. 24) positions outer sleeve member 222 of creeper control valve 192 (FIG. 33). When, for example, spool 224 is positioned by the operator to limit displacement to one half the maximum in either reverse or in first forward range, outer sleeve member 222 will move leftwardly reaching the position shown in FIG. 33 upon the displacement element reaching the one half displacement position, outer sleeve 222 then preventing greater displacement of the variable displacement hydrostatic pump-motor 20 by blocking flow of fluid pressure from passage 206 to passage 230. A decrease of displacement occurs when variable underspeed valve 194 (FIG. 20) moves leftwardly due to an increased load on the engine and consequent "lugging down" or when the engine command speed is increased by repositioning cam 238, the upshift passage 244 is opened to drain 488 allowing variable displacement hydrostatic pump-motor 20 to seek a lower displacement setting.

What is claimed is:

1. A hydromechanical transmission system for an engine driven-vehicle comprising:
   a transmission;
   a hydraulic control system;
   and fluid pressure means for providing fluid under pressure to the transmission and the control system, the pressure of said fluid under pressure bearing a direct relation to the speed of the vehicle engine;
   the transmission further comprising:
   an input shaft driven by the engine;
   an output shaft driving the vehicle;
   a variable displacement hydrostatic pump-motor;
   first drive means for selectively connecting the input shaft to the variable displacement hydrostatic pump-motor;
   a fixed displacement hydrostatic pump-motor hydraulically coupled to the variable displacement hydrostatic pump-motor allowing the fixed displacement hydrostatic pump motor to act as a motor while the variable displacement hydrostatic pump-motor is acting as a pump, further allowing the fixed displacement hydrostatic pump-motor to act as a pump while the variable displacement hydrostatic pump-motor is acting as a motor;
   a recycling planetary group comprising a recycling planetary carrier driven by the input shaft, a first sun gear, a plurality of first planet gears carried by the recycling planetary carrier and in intermeshing relation with the first sun gear, a plurality of second planet gears carried by the recycling planetary carrier overlapping with and in intermeshing relation with the first planet gears, a second sun gear in intermeshing relation with the second planet gears, and a recycling ring gear intermeshing with the second planet gears;
   a primary planet carrier drivingly connected to the output shaft;
   a first range planetary gear group having a first range sun gear, a plurality of first range planet gears carried by the primary planet carrier and a first range ring gear;
   second drive means for drivingly connecting the fixed displacement hydrostatic pump-motor to the first sun gear of the recycling planetary group and to the first range sun gear;
   a first range drive engagement means for selectively stopping rotation of the first range ring gear to provide a low range drive ratio;
   a third range drive engagement means for selectively engaging the recycling ring gear with the primary carrier to provide an intermediate range drive ratio; and
   a fourth range drive engagement means for selectively engaging the second sun gear with the primary carrier to provide a high range drive ratio;
   the control system further comprising:
   sense means for sensing engine speed;
   pedal means for selecting an engine speed;
   pump actuator control means responsive to said sense means and said pedal means for varying the reduction ratio of the transmission so that engine speed increases when the selected engine speed is greater than the sensed engine speed, and engine speed decreases when the selected engine speed is less than the sensed engine speed; and,
   clutch control means responsive to said pump actuator control means for actuating one of the drive engagement means.

2. The system as set forth in claim 1 wherein the transmission further comprises:
   a second range planetary gear group having a second range sun gear drivingly connected to the second sun gear of the recycling planetary group, a plurality of second range planet gears carried by the primary planet carrier, a second range ring gear; and a second range drive engagement means for selectively stopping rotation of the second range ring gear to provide a drive ratio between the low and intermediate range.

3. The system as set forth in claim 1 wherein the pump actuator control means further comprises underspeed valve means for comparing the sensed engine speed to the selected engine speed; said underspeed valve means responsive to the sense means and the pedal means.

4. The system as set forth in claim 3 wherein the sense means comprises:
   venturi means for providing a differential pressure in the fluid under pressure provided by the fluid pressure means to the transmission and the control system;
   said differential pressure comprising fluid pressure upsteam of the venturi means and the fluid pressure at the throat of the venturi.

5. The system as set forth in claim 4 wherein the pump actuator control means further comprises pressure compensator valve means for limiting pressure between the hydraulically coupled variable displacement hydrostatic pump-motor and the fixed displacement hydrostatic pump-motor;
   said pressure compensator valve means responsive to the pedal means.

6. The system as set forth in claim 5 wherein the control system further comprises:
   actuator means responsive to the pump actuator control means for varying the displacement of the variable displacement hydrostatic pump-motor;
   pressure signal means for sensing when the displacement of the variable displacement hydrostatic pump-motor is at a maximum; and wherein
   the pump actuator control means further comprises shift signal conditioner means responsive to said pressure signal means for signalling the clutch control means to engage a different drive engagement means, and further wherein the clutch control means further comprises logic means to insure said different drive engagement means is the next lower drive engagement means when the sensed engine speed is less than selected engine speed and said different drive engagement means is the next higher drive engagement means when the sensed engine speed is higher than the selected engine speed.

7. The system as set forth in claim 6 wherein the clutch control means further comprises means for varying the displacement of the variable displacement hydrostatic pump-motor to a substantially zero displacement condition before any drive engagement means may be engaged.

8. The system as set forth in claim 7 wherein the control system further comprises:
a control lever; and
wherein the clutch control means further comprises a range limiter control valve means responsive to said control lever for limiting selective engagement of drive engagement means to less than all the drive engagement means; and
wherein the pump actuator control means further comprises creeper valve means responsive to said control lever for selectively limiting the maximum displacement of the variable displacement hydrostatic pump-motor while said range limiter control valve means has limited engagement of drive engagement means to only the first drive engagement means.

9. The system as set forth in claim 8 wherein the first drive means for drivingly connecting the input shaft to the variable displacement hydrostatic pump-motor comprises:
a first transfer gear train assembly drivingly connected with the input shaft;
a first shaft assembly;
clutch means for selectively connecting the first gear train assembly with the first shaft assembly;
and further wherein the second drive means for drivingly connecting the fixed displacement hydrostatic pump-motor to the first sun gear of the recycling planetary gear group and to the first range sun gear comprises:
a second shaft assembly drivingly connected to the fixed displacement hydrostatic pump-motor;
brake means for selectively stopping rotation of said second shaft assembly; and
a second gear train assembly drivingly connecting said second shaft means to the first sun gear of the recycling planetary gear group and the first range sun gear.

10. The system as set forth in claim 9 wherein the control system further comprises lockup clutch control means for disengaging the clutch means selectively connecting the first gear train assembly with the first shaft assembly and engaging the brake means for selectively stopping rotation of the second shaft means while the fourth range drive engagement means has been engaged.

11. The system as set forth in claim 10 wherein the control system further comprises means for sensing when the variable displacement hydrostatic pump-motor is at a zero displacement.

12. The system as set forth in claim 11 wherein said range limiter control valve means further comprises:
means for allowing said output shaft to rotate in a first direction; and
means for allowing said output shaft to rotate in a second reverse direction, while said range limiter control valve means limits engagement of drive engagement means to the first drive engagement means.

13. The system as set forth in claim 12 wherein the control system further comprises:
variable relief valve means for providing a substantially higher fluid pressure while the first range drive engagement means is actuated than while one of the other drive engagement means is actuated.

14. The hydromechanical transmission system as set forth in claim 13 wherein the underspeed valve means comprises:
a valve housing defining a bore having a first and a second end, the first end defining an aperture, the second end defining an inlet port;
a plunger slidably contained in said bore at said first end of the bore and having a projection extending outwardly therefrom through the aperture;
a valve spool slidably contained in the bore and at the second end of the bore;
resilient means interposed between said plunger and said valve spool for urging said valve spool in a first direction;
said housing further defining a first inlet groove near the midpoint of said valve spool, and a second inlet groove substantially adjacent to said resilient means;
said housing further defining a first outlet groove and a second outlet groove each adjacent to said first inlet groove;
said valve spool defining a first annular groove adjacent to and in communication with said first outlet groove and a second annular groove adjacent to and in communication with said second outlet groove, said first annular groove separated from said second annular groove by a land of sufficient dimension to block said inlet groove;
said spool responsive to the differential pressure provided by the venturi means with the higher upstream pressure communicated to the first inlet port and the lower throat pressure communicated to the second inlet groove to position the land of said spool to block said first inlet groove.

15. The hydromechanical transmission system as set forth in claim 14 wherein the control system further comprises:
cam means responsive to the pedal means for urging the plunger of the underspeed valve means in the same first direction so that the resilient means urges the valve spool of the underspeed valve in the same first direction with a greater force while said pedal means is selecting a higher engine speed and to allow the resilient means to urge the underspeed valve in the same first direction with a lesser force while said pedal means is selecting a lower engine speed.

* * * * *